(12) United States Patent
Tanzer et al.

(10) Patent No.: US 9,323,946 B2
(45) Date of Patent: Apr. 26, 2016

(54) EDUCATING USERS AND ENFORCING DATA DISSEMINATION POLICIES

(71) Applicant: Microsoft Technology Licensing, LLC, Redmond, WA (US)

(72) Inventors: Brett A. Tanzer, Mercer Island, WA (US); Vidyaraman Sankaranarayanan, Redmond, WA (US); Lynn C. Ayres, Redmond, WA (US); Asaf Kashi, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/508,407

(22) Filed: Oct. 7, 2014

(65) Prior Publication Data

US 2015/0026763 A1    Jan. 22, 2015

Related U.S. Application Data

(63) Continuation of application No. 13/361,501, filed on Jan. 30, 2012, now Pat. No. 8,880,989.

(51) Int. Cl.
| | |
|---|---|
| G06F 17/00 | (2006.01) |
| G06F 21/62 | (2013.01) |
| G06F 17/22 | (2006.01) |
| G06F 21/60 | (2013.01) |
| G06Q 10/10 | (2012.01) |

(52) U.S. Cl.
CPC ........ *G06F 21/6218* (2013.01); *G06F 17/2235* (2013.01); *G06F 21/604* (2013.01); *G06F 21/6209* (2013.01); *G06Q 10/10* (2013.01); *G06F 2221/2141* (2013.01)

(58) Field of Classification Search
CPC ..................... G06F 17/2235; G06F 17/30896
USPC ................................................. 715/202, 255
See application file for complete search history.

(56) References Cited

U.S. PATENT DOCUMENTS

| | | | | |
|---|---|---|---|---|
| 5,444,779 | A | * | 8/1995 | Daniele ........................ 399/366 |
| 5,958,005 | A | | 9/1999 | Thorne et al. |
| 6,006,242 | A | | 12/1999 | Poole et al. |

(Continued)

FOREIGN PATENT DOCUMENTS

| | | |
|---|---|---|
| KR | 20060050444 A | 5/2006 |
| KR | 20060065480 A | 6/2006 |
| KR | 20110068072 A | 6/2011 |

OTHER PUBLICATIONS

"Proofpoint Enterprise Privacy for Data Loss Prevention", Retrieved at <<http://www.proofpoint.com/products/privacy/index.php>>, Retrieved Date: Jan. 13, 2012, 2 pages.

(Continued)

*Primary Examiner* — Laurie Ries
(74) *Attorney, Agent, or Firm* — Damon Rieth; Tom Wong; Micky Minhas

(57) ABSTRACT

An authoring component determines the sensitivity of an authored document and generates a user interface conveying contextual educational information about data dissemination policies that apply to the document. The user interface also provides user input mechanisms that allow the user to provide inputs affect the enforcement of a given data dissemination policy on the document.

20 Claims, 21 Drawing Sheets

(56) References Cited

U.S. PATENT DOCUMENTS

| | | | |
|---|---|---|---|
| 6,014,135 A * | 1/2000 | Fernandes | 715/744 |
| 6,104,990 A | 8/2000 | Chaney et al. | |
| 6,148,297 A * | 11/2000 | Swor et al. | |
| 6,308,148 B1 * | 10/2001 | Bruins et al. | 703/27 |
| 6,629,081 B1 | 9/2003 | Cornelius et al. | |
| 6,678,409 B1 | 1/2004 | Wu et al. | |
| 6,826,609 B1 | 11/2004 | Smith et al. | |
| 6,850,252 B1 * | 2/2005 | Hoffberg | 715/716 |
| 6,968,308 B1 | 11/2005 | Brockett et al. | |
| 7,181,017 B1 | 2/2007 | Nagel et al. | |
| 7,454,778 B2 | 11/2008 | Pearson et al. | |
| 7,483,977 B2 | 1/2009 | Mikhailov et al. | |
| 7,533,420 B2 | 5/2009 | Battagin et al. | |
| 7,610,233 B1 * | 10/2009 | Leong et al. | 705/37 |
| 7,729,995 B1 * | 6/2010 | Alain | G06F 21/6209 705/64 |
| 7,738,900 B1 | 6/2010 | Manroa et al. | |
| 7,787,863 B2 | 8/2010 | van de Groenendaal | |
| 7,797,010 B1 * | 9/2010 | Manroa et al. | 455/519 |
| 7,809,698 B1 * | 10/2010 | Salz et al. | 707/694 |
| 7,853,472 B2 | 12/2010 | Al-Abdulqader et al. | |
| 7,876,335 B1 * | 1/2011 | Pittenger et al. | 345/629 |
| 7,903,549 B2 | 3/2011 | Judge et al. | |
| 7,913,167 B2 | 3/2011 | Cottrille | |
| 8,117,022 B2 | 2/2012 | Linker | |
| 8,140,664 B2 | 3/2012 | Huang et al. | |
| 8,140,864 B2 | 3/2012 | Osaki | |
| 8,151,200 B2 | 4/2012 | Roger et al. | |
| 8,161,526 B2 | 4/2012 | Corrao et al. | |
| 8,234,693 B2 * | 7/2012 | Stahl et al. | 726/4 |
| 8,316,049 B2 | 11/2012 | Saito | |
| 8,316,237 B1 | 11/2012 | Felsher et al. | |
| 8,346,532 B2 | 1/2013 | Chakra et al. | |
| 8,396,838 B2 | 3/2013 | Brockway et al. | |
| 8,539,349 B1 * | 9/2013 | Kirshenbaum | 715/264 |
| 8,554,576 B1 * | 10/2013 | Reicher et al. | 705/3 |
| 8,676,187 B2 * | 3/2014 | Ionescu et al. | 455/422.1 |
| 8,707,384 B2 * | 4/2014 | Jain et al. | 726/1 |
| 8,880,989 B2 | 11/2014 | Tanzer et al. | |
| 9,087,039 B2 * | 7/2015 | Gandhi | G06F 17/27 |
| 2001/0018746 A1 * | 8/2001 | Lin | 713/201 |
| 2001/0028364 A1 * | 10/2001 | Fredell et al. | 345/751 |
| 2003/0074354 A1 * | 4/2003 | Lee et al. | 707/8 |
| 2003/0105734 A1 * | 6/2003 | Hitchen et al. | 707/1 |
| 2003/0182573 A1 * | 9/2003 | Toneguzzo et al. | 713/201 |
| 2004/0205531 A1 | 10/2004 | Innes et al. | |
| 2004/0243408 A1 | 12/2004 | Gao et al. | |
| 2004/0260697 A1 | 12/2004 | Ohnuma et al. | |
| 2006/0048224 A1 | 3/2006 | Duncan et al. | |
| 2006/0094400 A1 | 5/2006 | Beachem et al. | |
| 2006/0117014 A1 * | 6/2006 | Qi | G06F 21/6218 |
| 2006/0120526 A1 | 6/2006 | Boucher et al. | |
| 2006/0129942 A1 * | 6/2006 | McCary | 715/741 |
| 2006/0253275 A1 | 11/2006 | Parkinson et al. | |
| 2006/0272024 A1 | 11/2006 | Huang et al. | |
| 2007/0168666 A1 | 7/2007 | Craigie | |
| 2007/0174610 A1 * | 7/2007 | Furuya | H04N 1/4406 713/167 |
| 2007/0261099 A1 * | 11/2007 | Broussard et al. | 726/1 |
| 2008/0027910 A1 | 1/2008 | Wen et al. | |
| 2008/0052395 A1 | 2/2008 | Wright et al. | |
| 2008/0104381 A1 | 5/2008 | Peacock et al. | |
| 2008/0201376 A1 | 8/2008 | Khedouri et al. | |
| 2008/0221882 A1 * | 9/2008 | Bundock et al. | 704/235 |
| 2008/0235760 A1 * | 9/2008 | Broussard et al. | 726/1 |
| 2008/0302870 A1 | 12/2008 | Berini et al. | |
| 2008/0310718 A1 | 12/2008 | Balchandran et al. | |
| 2009/0019121 A1 | 1/2009 | Mears | |
| 2009/0070881 A1 | 3/2009 | Yellepeddy et al. | |
| 2009/0119372 A1 | 5/2009 | Callanan et al. | |
| 2010/0036779 A1 | 2/2010 | Sadeh-Koniecpol et al. | |
| 2010/0063923 A1 | 3/2010 | Lundberg et al. | |
| 2010/0076957 A1 | 3/2010 | Staddon et al. | |
| 2010/0095349 A1 | 4/2010 | Motoyama | |
| 2010/0169771 A1 * | 7/2010 | Pelegrin et al. | 715/700 |
| 2010/0174528 A1 | 7/2010 | Oya et al. | |
| 2010/0180213 A1 | 7/2010 | Karageorgos et al. | |
| 2010/0306139 A1 | 12/2010 | Wu et al. | |
| 2011/0040983 A1 | 2/2011 | Grzymala-Busse et al. | |
| 2011/0060747 A1 | 3/2011 | Rose et al. | |
| 2011/0078587 A1 | 3/2011 | Guy et al. | |
| 2011/0148938 A1 * | 6/2011 | Yang | 345/690 |
| 2011/0166918 A1 | 7/2011 | Allaire et al. | |
| 2011/0246965 A1 * | 10/2011 | Strack et al. | 717/124 |
| 2011/0276713 A1 * | 11/2011 | Brand | H04L 67/1097 709/232 |
| 2011/0276800 A1 * | 11/2011 | Adams et al. | 713/166 |
| 2012/0084868 A1 * | 4/2012 | Julisch | 726/26 |
| 2012/0114119 A1 | 5/2012 | Ahuja et al. | |
| 2013/0198618 A1 | 8/2013 | Tenzer et al. | |
| 2013/0204609 A1 | 8/2013 | Gandhi et al. | |

OTHER PUBLICATIONS

"The Anti-Spam & Email Security Platform a Solution for Every Organization", Retrieved at <<http://www.sonicwall.com/us/products/376.html>>, Retrieved Date: Jan. 13, 2012, 2 pages.

International Search Report and Written Opinion for International Application No. PCT/US2013/023037, Filing date: Jan. 25, 2013, 7 pages.

Prosecution History for U.S. Appl. No. 13/361,501 including: Issue Notification dated Oct. 15, 2014, Notice of Allowance dated Jul. 8, 2014, Amendment with RCE dated Mar. 27, 2014, Final Office Action dated Nov. 27, 2013, Amendment dated Sep. 30, 2013, Non Final Office Action dated May 24, 2013, and Application filed Jan. 30, 2012. 112 pages.

Paukkeri, Mari-Sanna, et al. "A Language-Independent Approach to Keyphrase Extraction and Evaluation." COLING (Posters). 2008. 4 pages Bracewell. D. B., Ren, F., & Kunowa, S. (2005). Multilingual single document keyword extraction for information retrieval. In Natural Language Processing and Knowledge Engineering, 2005, IEEE NLP-KE'05. Proceedings of 2005 IEEE International Conference on (pp. 517-522) IEEE.

"International Search Report", Mailed Date: Jun. 4, 2013, Application No. PCT/US2013/024244, Filed Date: Feb. 1, 2013, 9 pages.

Prosecution History from U.S. Appl. No. 13/367,469 including: Advisory Action dated Nov. 13, 2014, Amendment after Final dated Oct. 30, 2014, Applicant Initiated Interview Summary dated Oct. 20, 2014, Final Office Action dated Aug. 26, 2014, Amendment dated Jun. 17, 2014, Non-Final Office Action dated Mar. 14, 2014, and Application and Drawings filed Feb. 7, 2012, 87 pages.

Charbonneau, Stephane. "The role of user-driven security in data loss prevention," Computer Fraud & Security 2011.11 (2011): 5-8.

Prosecution History from U.S. Appl. No. 13/367,469 including: Non-Final Office Action dated Jan. 22, 2015 and Amendment with RCE dated Dec. 16, 2014, 14 pages.

Prosecution History for U.S. Appl. No. 13/367,469 including: Notice of Allowance dated Mar. 27, 2015 and Amendment dated Mar. 12, 2015, 19 pages.

Issue Notification for U.S. Appl. No. 13/367,469 dated Jun. 30, 2015, 1 page.

Prosecution History for U.S. Appl. No. 14/747,428 including: Preliminary Amendment dated Oct. 6, 2015, Response to Notice to File Missing Parts dated Oct. 6, 2015, Notice to File Missing Parts dated Jul. 6, 2015, Application and Drawings filed Jun. 23, 2015, 49 pages.

Non-Final Office Action for U.S. Appl. No. 14/747,428 dated Dec. 11, 2015, 10 pages.

"International Preliminary Report on Patentability Issued in PCT Application No. PCT/US13/24244", Mailed Date: Aug. 21, 2014, 6 Pages. (MS# 335372.02).

"Supplementary Search Report Received for European Patent Application No. 13747052.2", Mailed Date: Nov. 4, 2015, 7 Pages. (MS# 335372.04).

Lee, et al., "Development of a Multi-Classifier Approach for Multilingual Text Categorization", In Proceeding of the International Conference on Data Mining, Jun. 26, 2006, 5 Pages.

* cited by examiner

EDUCATING USERS AND ENFORCING DATA DISSEMINATION POLICIES

CROSS-REFERENCE TO RELATED APPLICATION

The present application is a continuation of and claims priority of U.S. patent application Ser. No. 13/361,501, filed Jan. 30, 2012, the content of which is hereby incorporated by reference in its entirety.

BACKGROUND

There are currently a variety of different sources of policies and regulations that govern the dissemination of personal information. In fact, there are even a variety of different sources of governmental regulations that govern the dissemination of personal information. Some of these regulations include SOX, HIPPA, and GLBA. Organizations that deal with certain types of information are required to be in compliance with all of these regulations.

Another source of data dissemination policies can come from an organization itself. For instance, organizations often have internal policies that govern how certain types of information can be disseminated. By way of example, some organizations have policies governing the dissemination of intellectual property content, to ensure that it does not leak out of the company. Some organizations also have policies that govern the use of inappropriate language by employees in various forms of communications, such as electronic mail communications, instant messaging communications, chats, etc.

Often, the content that is subject to these regulations and policies is operated on by information workers that have specific business needs and are operating under time constraints. These information workers may have a handbook that contains a large volume of regulations or policies (both internal and external), and the worker is expected to know and comply with all of them.

Current attempts to enforce data dissemination policies or regulations (collectively referred to as data dissemination policies) is quite cumbersome and can interfere with the information worker's daily tasks. For instance, some organizations attempt to enforce both internal and external data dissemination policies on information workers through different mechanisms. Some current systems enforce these polices in electronic mail traffic by making an estimate of whether an electronic mail message has sensitive data in it, and then blocking or moderating that data. In one specific example, when an information worker composes an email, with sensitive content, to multiple recipients, the information worker is presented with a dialog requiring the information worker to ensure that each recipient has authorization to access the sensitive content. This is a fairly cumbersome process and usually reduces productivity, while its impact on ensuring compliance with data dissemination policies is relatively small. These and other types of measures often impede the business that can be conducted by an information worker, causing the information worker to become annoyed with such policies and attempt to work around them in order to complete the business transactions they are attempting to perform.

The discussion above is merely provided for general background information and is not intended to be used as an aid in determining the scope of the claimed subject matter.

SUMMARY

An authoring component determines the sensitivity of an authored document and generates a user interface conveying contextual educational information about data dissemination policies that apply to the document. The user interface also provides user input mechanisms that allow the user to provide inputs that affect the enforcement of a given data dissemination policy on the document.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
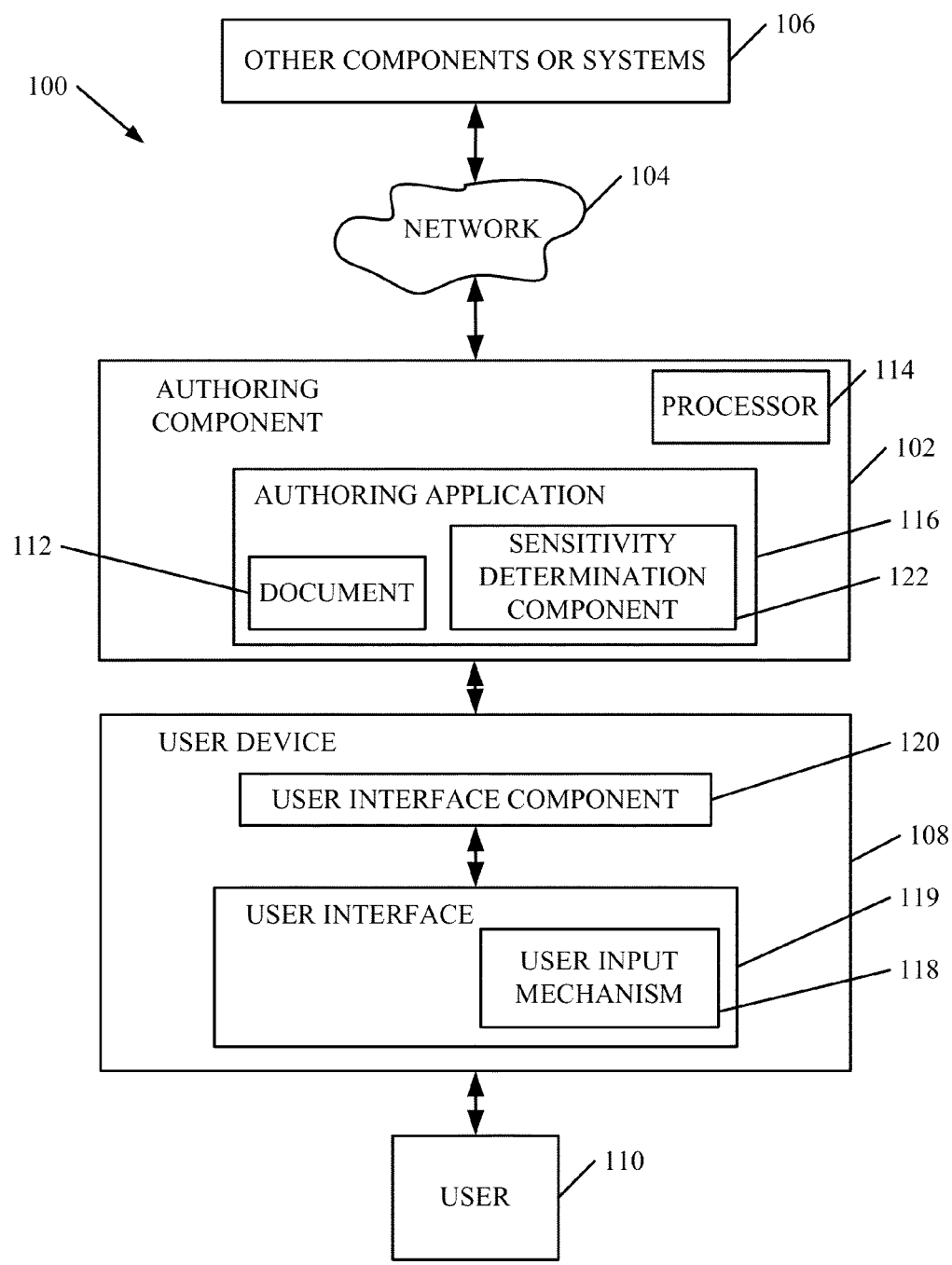
FIG. 1 is a block diagram of one illustrative authoring system.

FIG. 1 is a block diagram of one illustrative embodiment of an authoring system 100. Authoring system 100 includes authoring component 102 that is connected, by way of example, through network 104, to other components or systems 106. Authoring component 102 is also illustratively coupled to a user device 108. User 110 interacts with authoring component 102 through user device 108 in order to generate a document 112. Authoring component 102 illustratively includes processor 114 that is coupled to, and activated by, the other components of authoring component 102 and is a functional part of authoring component 102. Processor 114 illustratively facilitates the functionality of the other components that it is coupled to.

In the embodiment shown in FIG. 1, authoring component 102 is a computing device that runs an authoring application 116 that allows user 110 to generate document 112. In doing so, user 110 interacts with user input mechanisms 118 that are on a user interface display 119 generated by user interface component 120 on user device 108. The user inputs are provided to authoring application 116.

The document 112, as it is being authored, is provided to sensitivity determination component 122. Component 122 can take a variety of different forms (some of which are described below) to determine whether document 112 is a sensitive document that is subject to either internal or external document dissemination policies. If so, document determination component 122 causes user interface component 120 to generate, on user interface 119, a display that describes the data dissemination policies that apply to document 112, and any actions which will be taken based on the application of those policies to document 112. Similarly, in one embodiment, component 122 causes user interface component 120 to generate a user input mechanism 118 that allows user 110 to provide feedback on the policy or to take a variety of other actions that affect the application of the specific data dissemination policy to document 112 being authored by user 110. A variety of these actions are described below with respect to FIGS. 2-2M. Thus, the system provides the user 110 with education about the data dissemination policies, in the context of authoring a document that is subject to those policies, and the opportunity to provide feedback on the policies or modify how the document 112 is treated.

Before proceeding further with the present description, it should be noted that the various components and portions of system 100 are shown divided into various applications and components, but this is done for the sake of example only. The components can be combined in other ways, or split up differently, so that the functionality performed by any given component in FIG. 1 can be performed by a different component, combined with a different component, or further divided into more components. For example, authoring component 102 can reside on user device 108. They are shown separately for the sake of example only. In addition, sensitivity determination component 122 is shown as part of authoring application 116, but it could be disposed separately and accessed by authoring application 116. Further, user device 108 can be a wide variety of different devices, such as a desktop computer, a laptop computer, a tablet computer, a palm top computer or handheld device, a cellular telephone, smart phone, multimedia player, personal digital assistant, or a wide variety of other devices. Some of these are described in more detail below.

Figure 2:
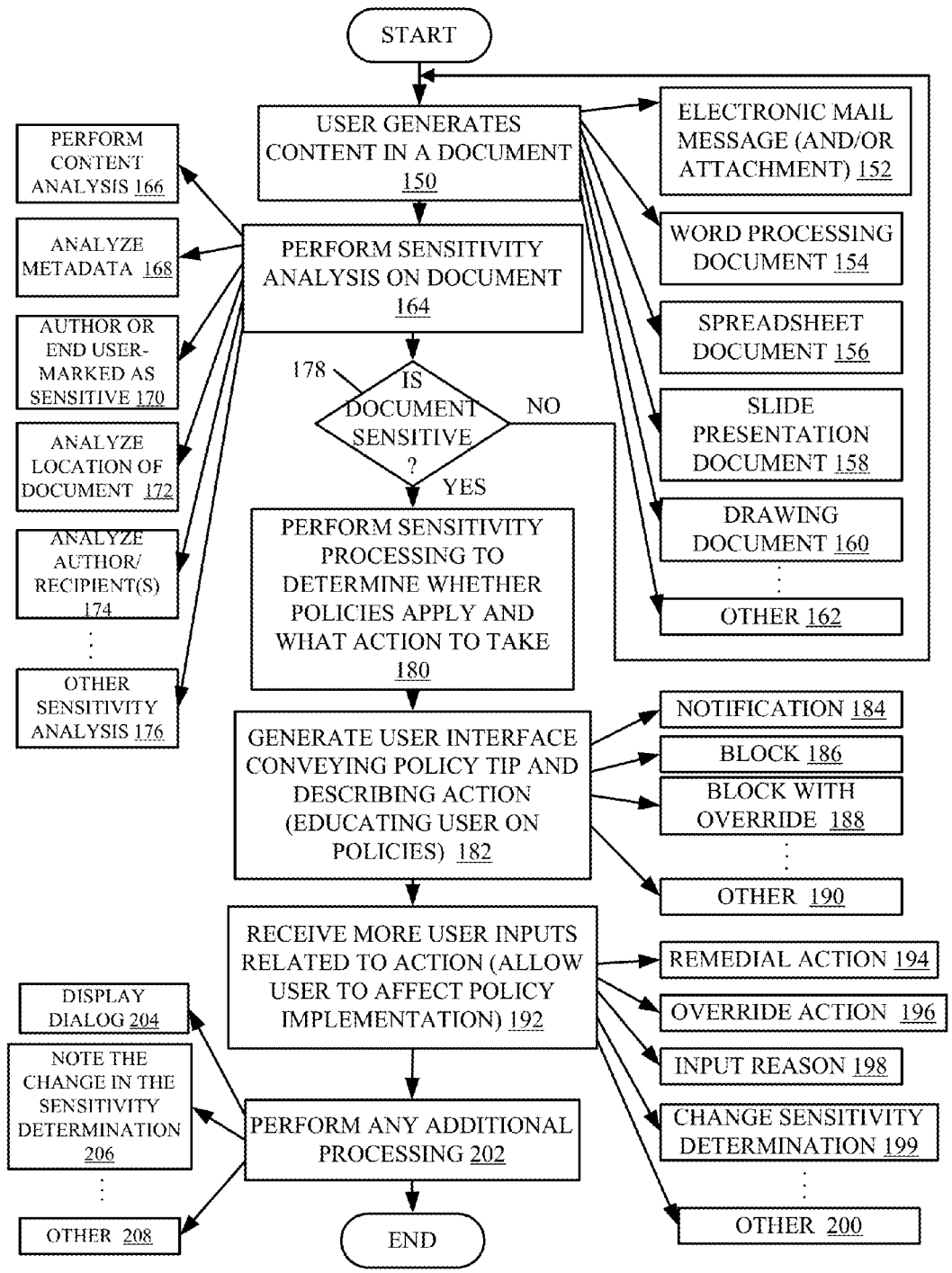
FIG. 2 is one embodiment of a flow diagram illustrating the operation of the system shown in FIG. 1.

In any case, FIG. 2 is a flow diagram illustrating one embodiment of the operation of system 100, shown in FIG. 1. The present description will now proceed with respect to authoring application 116 being an electronic mail application that is accessed by user 110, through user device 108, in order to send an electronic mail message to another component or system 106 over a network 104. It will be appreciated that authoring application 116 can be any type of application that can be used to generate a document. Thus, the term document is used herein to mean any collection of content generated by user 110. Therefore, the application 116 can be an electronic mail or other communication application, a word processing application, a slide presentation application, a drawing program, a spreadsheet application, or a combination of these applications. Network 104 can of course be any network, such as a local area network, a wide area network, a wireless or hardwired network, or another type of communications network. The present description of FIGS. 1-2M will now proceed with respect to authoring application 116 being an electronic mail application, but this is for purposes of example only.

In one embodiment, user 110 first accesses authoring component 102 and opens authoring application 116. Authoring application 116 generates, though user interface component 120, a user interface display 119 that allows user 110 to create a document 112 and generate content in document 112. In the embodiment where application 116 is an electronic mail application, user 110 provides the necessary user inputs through mechanisms 118 to open a new electronic email message and begin typing, attaching other documents, or taking other actions to generate content in an electronic mail message. The user generating content in a document 112 is indicated by block 150 in FIG. 2.

As briefly described above, the document 112 need not necessarily be an electronic mail message or attachment, as indicated by block 152 in FIG. 2, but it could be a word processing document 154, a spreadsheet document 156, a slide presentation document 158, a drawing document 160, or some other type of document 162. In each of those embodiments, authoring application 116 will illustratively be the corresponding application that can be used to generate such a document.

As the user 110 is generating document 112, authoring application 116 invokes sensitivity determination component 122 to perform a sensitivity analysis on document 112 to determine whether it (as yet) includes sensitive information or is otherwise determined to be a sensitive document that is subject to one or more data dissemination policies. This is indicated by block 164 in FIG. 2. In one embodiment, sensitivity determination component 122 performs content analysis on the content of document 112 to determine whether it contains sensitive information. For instance, sensitivity determination component 122 can scan the content of document 112 to determine whether it contains vulgar language, credit card information, a social security number, a customer's personal address, etc. If so, sensitivity determination component 122 determines that the document 112 is a sensitive document. This is indicated by block 166 in FIG. 2.

Other types of sensitivity analysis can be performed as well. For instance, some documents 112 may have associated metadata tags where one of those tags may indicate whether the document 112 is sensitive. In that case, sensitivity determination component 122 simply reads the appropriate metadata tag to determine whether document 112 is sensitive, regardless of its content. Analyzing metadata is indicated by block 168 in FIG. 2.

Alternatively, user 110 may expressly mark document 112 as being sensitive in some other way. If that is the case, component 122 simply looks for the user marking of sensitivity, again regardless of the content of document 112. This is indicated by block 170 in FIG. 2.

In another embodiment, component 122 determines the sensitivity of document 112 based on a location where it is stored or from which it is being accessed or generated. For instance, a supervisor may be conducting research on whether to acquire a competitor. All of the documents that embody the research may be shared on a collaboration site, or stored in a given folder on a storage system. The supervisor may mark the entire collaboration site or folder as being sensitive. In that case, sensitivity determination component 122 simply determines whether the location where the document 112 is stored or where it is being accessed or generated has been marked as sensitive. If so, document 112 is automatically marked as sensitive, regardless of its content. This is indicated by block 172 in FIG. 2.

In another embodiment, it may be that a given user 110 or recipient of a document 112 means that the document 112, itself, is sensitive. For instance, it may be that a certain individual in a human resources department is in charge of collecting all employee evaluations (that were generated from the employees' supervisors). In that case, it may be that all documents sent to that particular recipient in the human resources department will be labeled as sensitive. Also, it may be that a give person in the human resources department is responsible for handling salary information with individual employees. In that case, it may be desirable to have all documents generated by that person in the human resources department labeled sensitive. Therefore, every document generated by that person will be determined to be sensitive by component 122. Analyzing the author and recipient of a document to determine sensitivity is determined by block 174 in FIG. 2.

Of course, these are exemplary only and other sensitivity analyses can be performed. This is indicated by block 176.

Based on the analysis performed, sensitivity determination component 122 determines whether document 112, as yet, is classified as a sensitive document. This is indicated by block 178 in FIG. 2. If not, then processing reverts back to block 150 where component 122 waits for further content to be entered into document 112, to perform additional sensitivity analyses.

However, if at block 178 it is determined that the document 112 is sensitive, then authoring application 116 illustratively performs sensitivity processing to determine whether and which data dissemination policies apply and what action is to be taken based on the policies that are to be applied to document 112. This is indicated by block 180 in FIG. 2. For instance, where document 112 is not highly sensitive (such as not containing credit card or social security information) it may be that the data dissemination policies implemented by application 116 simply require application 116 to notify user 110 of those policies and to instruct the user how to comply with the policies. In that case, application 116 generates a user interface through user interface component 120 that conveys a policy tip to the user that describes why the particular policy is being applied to document 112, and that also describes any action to be taken by application 116 in applying that policy. This amounts to educating the user on the dissemination policies that are being applied, in the context of the document while it is still being authored and displayed to user 110. For instance, application 116 may generate a user interface display, that describes textually that the user is to ensure that all recipients of the electronic mail transmission are authorized to receive it. This is indicated by block 182 in FIG. 2.

A number of exemplary actions that can be taken by application 116 are based on application of the data dissemination policies to document 112 also shown in FIG. 2. For instance, application 116 can simply notify user 112 that data dissemination is going to be applied to document 112. Notification is indicated by block 184 in FIG. 2.

Application 116 can also block an action that the user is attempting to take. For instance, where application 116 is an electronic mail application, and either the attachment or the body of the electronic mail contains sensitive material, and where the user is attempting to send that electronic mail message outside of the company, the sending operation may be blocked. The blocking action is indicated by block 186 in FIG. 2.

In another embodiment, application 116 not only conveys a message indicating why a data dissemination policy is going to apply to document 112, and describes the action that the application will take (such as blocking the sending of an email), but it can also provide the user with an opportunity to modify or override the action to be taken by application 116 in enforcing the data dissemination policy. For instance, assume that the user has typed a sequence of numbers in the body of an electronic mail message. Assume also that sensitivity determination component 122 has analyzed that content and has estimated that it contains a credit card number. Then, when the user clicks on the Send button to send the electronic mail message, application 116 can display a notification 184 indicating that it has been determined that the electronic mail message contains sensitive material and further indicating that the send operation will be blocked. However, application 116 may also provide suitable user mechanisms 118 on a user interface generated by user interface component 120, that allows the user to override the blocking action. By way of example, assume that the digits entered in the body of the electronic mail message were not actually a credit card number, but were instead some other type of number that is not sensitive. Then, when the user actuates the appropriate override user input mechanism, the user can change the sensitivity determination or simply override the blocking action. Generating the user interface with the blocking and overriding features is indicated by block 188 in FIG. 2. Of course, application 116 can generate the user interface conveying a policy tip and describing the action to be taken in other ways as well, and this is indicated by block 190 in FIG. 2.

In response to generating the policy tip and describing the action to be taken, at block 182, the user can provide one or more user inputs through user input mechanisms 118, that determine how further processing is performed. This is indicated by block 192 in FIG. 2. For instance, user 110 might take remedial action in order to comply with the data dissemination policies described at block 182. By way of example, if the policy tip describing the policy to be forced on document 112 states that sending an email transmission is going to be blocked because it is being sent to an unauthorized recipient, user 110 might simply take remedial action to delete the offending recipient from the electronic mail message. Similarly, the user may delete the sensitive information from document 112 so that it can be sent, unencumbered. Other remedial actions can be taken by the user as well in order to influence what happens with document 112, in accordance with the data dissemination policies implemented by application 116. Taking remedial action is indicated by block 194 in FIG. 2.

The user 110 may also take an override action. This was discussed above with respect to block 188. Again, the description of the policy being implemented and the action being taken may be that the electronic mail message is to be blocked, because it contains sensitive information or because it is being sent to an unauthorized recipient. The user may wish to override this action because, while the sensitive information is being sent to an unauthorized recipient, the recipient can be trusted and the electronic mail message contains time sensitive information that is required in order to complete a business transaction, on time. Taking the override action is indicated by block 196 in FIG. 2.

The user may also input a reason that the user is overriding the action. For instance, and as is discussed below in greater detail with respect to FIGS. 2A-2M, when the user wishes to override an action, application 116 may generate a dialog box on user interface 119 that allows the user to input a reason that the proposed action is being overridden.

Similarly, user 110 may change the sensitivity determination. For instance, if sensitivity determination component 122 identifies a sequence of numbers in document 112 and estimates the sequence is a credit card number, when in fact it is not, user 110 can illustratively input, through one of user input mechanisms 118, an indication that the sensitivity determination component 122 is inaccurate, and that document 112 actually does not contain sensitive information. Changing the sensitivity determination is indicated by block 198 in FIG. 2. Of course, the user can take other actions as well. This is indicated by block 200 in FIG. 2.

Finally, application 116 performs any additional processing based on the user inputs received at block 192. For instance, as discussed above, application 116 might generate a dialog box that allows the user to input even further inputs or to select from a menu of items. This is indicated by block 204 and examples are described below with respect to FIGS. 2A-2M. Similarly, application 116 may simply inform sensitivity determination component 122 of the change in the sensitivity determination. This can be used by component 122 to train itself to better recognize sensitive information. Noting the change in the sensitivity determination is indicated by block 206 in FIG. 2. Of course, application 116 can perform other processing as well. This is indicated by block 208.

A series of user interface displays will now be discussed to better illustrate one embodiment of the operation of system 100, as described with respect to FIG. 2. It will be noted that the user interface displays described in FIGS. 2A-2M are showing an embodiment in which application 116 is an electronic mail application. Of course, this is exemplary only and other user interface displays can be generated where application 116 is another application, such as a word processing application, a spreadsheet application, a drawing application, etc.

Figure 2A:
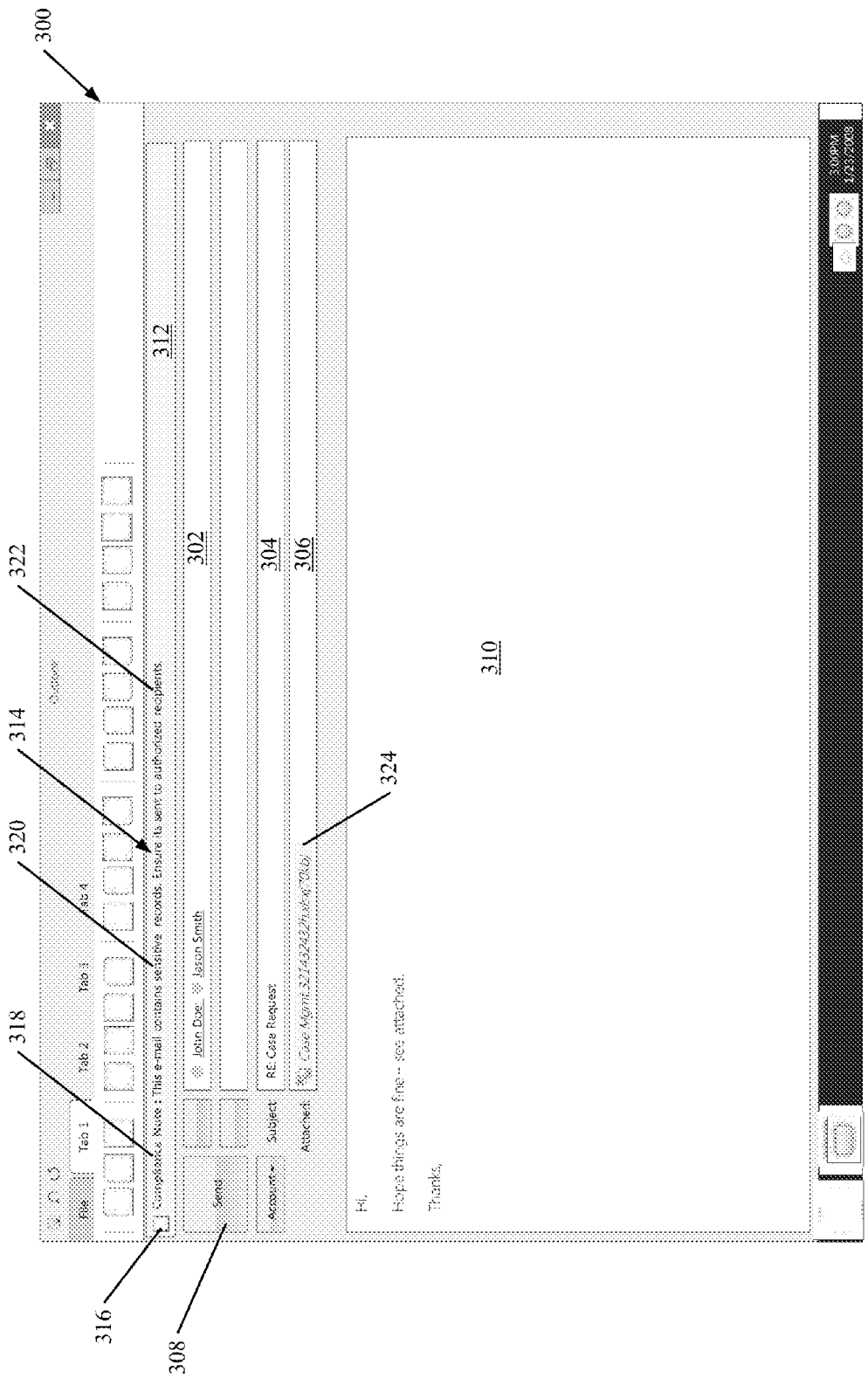
FIGS. 2A-2M are screenshots further illustrating one embodiment of the operation of the system shown in FIG. 1.

In any case, FIG. 2A shows a user interface display 300 in which a user 110 is generating an electronic mail message. The electronic mail message in display 300 illustratively has a recipients portion 302, a subject portion 304, an attachment portion 306, a send button 308, a message body portion 310, and a user education portion 312. In the embodiment shown in FIG. 2A, user 110 has generated a short electronic mail message in body portion 310 and has attached a document within attachment portion 306. There are two recipients, John Doe and Jason Smith, for the electronic email message.

As the user is generating the electronic mail message (which corresponds to document 112) sensitivity determination component 122 is analyzing document 112 to determine whether it contains sensitive material. When the spreadsheet attachment is attached in portion 306, sensitivity determination component 122 also analyzes that attachment.

In the embodiment shown in FIG. 2A, sensitivity determination component 122 has analyzed the attachment portion 306 and has found that it contains sensitive records. Therefore, application 116 generates on user interface display 300 the notification 314 in portion 312. Notification 314 includes an icon 316, a heading 318, a description 320 and a warning or instruction 322. Icon 316 is associated with the compliance note or tip that is displayed in portion 312. It illustratively contains a graphic image of something, and that image can change depending on the particular data dissemination policies being mentioned in portion 312. Of course, icon 316 can be a static icon as well.

Heading note portion 318 is simply a heading that indicates that a data dissemination policy is going to be applied to the electronic mail message being authored, or to an attachment. Description portion 320, in this embodiment, states "This e-mail contains sensitive records." Thus, description portion 320 describes the reason that a data dissemination policy is going to be applied to this electronic mail message. Warning or instruction portion 322 states "Ensure it is sent to authorized recipients." This portion instructs the user how to comply with the particular data dissemination policy being implemented. Therefore, in portion 312 in display 300 it can be seen that portion 318 notifies the user that a data dissemination is being implemented, and description portion 320 and warning or instruction portion 322 educate user 110 as to the reason that a data dissemination policy is being implemented and as to how to comply with that policy. This is all done in the context of the document itself (the email message and attachment) while the document is being authored and while it is being displayed to user 110.

In the embodiment shown in FIG. 2A, it can also be seen that attachment 324 is highlighted. In one embodiment, the portion of the electronic mail message (document 112) that is sensitive is illustratively indicated by some type of visual cue that distinguishes it on display 300. In the embodiment shown in FIG. 2A, attachment 324 is illustratively highlighted in a different color, such as yellow, than the rest of the user interface display 300. This indicates that attachment 324 is the part of the email that contains the sensitive records mentioned in description portion 320.

Figure 2B:
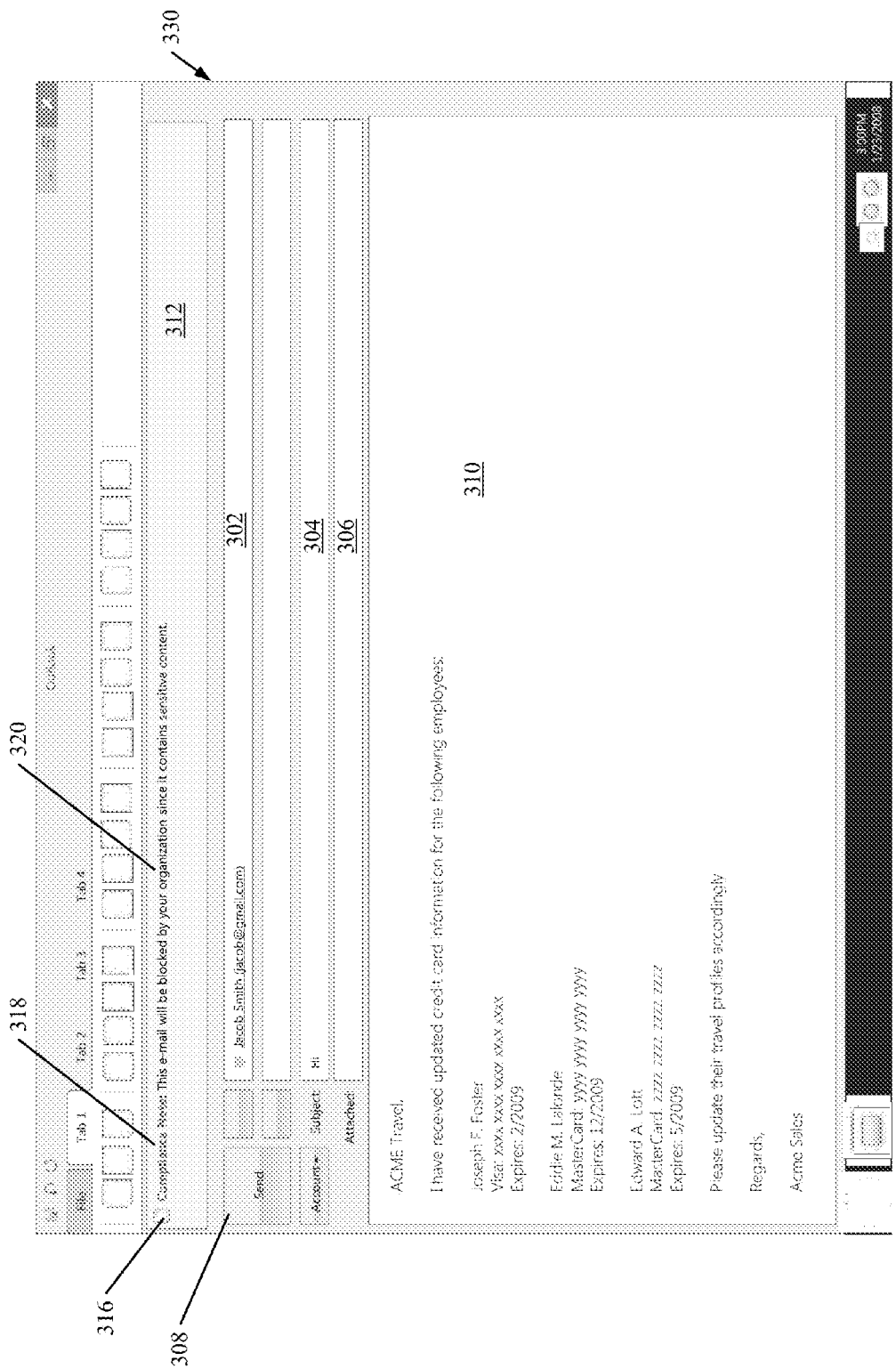

FIG. 2B shows another user interface display 330 that can be generated by application 116 using user interface component 120. A number of items on user interface display 330 are similar to those shown in FIG. 2A, and are similarly numbered. A number of differences can be noted, however. It can be seen from FIG. 2B that the sensitive information is contained in the body 310 of the electronic mail message, rather than in an attachment. Therefore, as user 110 is typing the body 310 of the electronic mail message, sensitivity determination component 122 is analyzing the content and identifies credit card numbers in body 310. Of course, for the sake of this embodiment, the actual numbers have been replaced by the characters x, y and z. Because the electronic mail message contains sensitive information, a data dissemination policy is applied to the email. In the embodiment shown, description portion 320 in portion 312 describes not only why the data dissemination policy is implemented with respect to this email, but the action that is going to be taken by application 116. The compliance note states "This email will be blocked by your organization since it contains sensitive content." This not only indicates why a data dissemination policy is being implemented (because the email contains sensitive content) but it also educates the user as to what application 116 will be doing with the email because of that policy (blocking it).

Figure 2C:
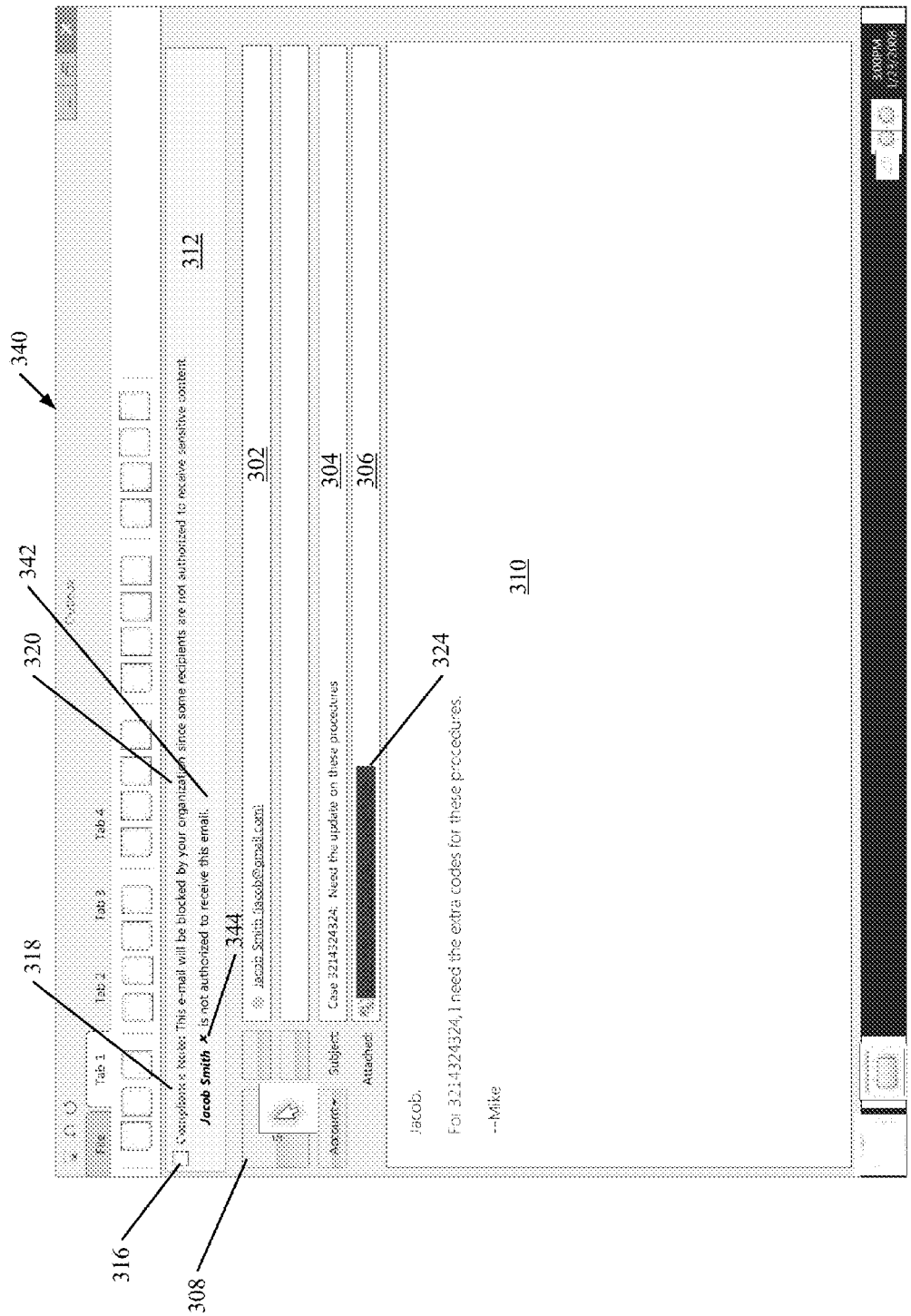

FIG. 2C shows yet another user interface display 340 that can be generated by application 116, using user interface component 120. A number of items are similar to those shown in FIGS. 2A and 2B and are similarly numbered.

It will be noted, however, that description portion 320 describes a different set of circumstances for applying a data dissemination policy. In the embodiment shown in FIG. 2C, sensitivity determination component 122 has analyzed the content of attachment 324 and found that it contains sensitive material. Component 122 has also analyzed the recipients of the email in portion 302 and found that one of them "Jacob Smith" is not authorized to receive sensitive content identified in attachment 324. Therefore, in the embodiment shown in FIG. 2C, description portion 320 describes this set of circumstances. It states, by way of example, "This email will be blocked by your organization since some recipients are not authorized to receive sensitive content." Thus, description portion 320 describes not only the set of circumstances (sensitive content and unauthorized recipient) but it also describes the action that will be taken (the email will be blocked).

Portion 312 on display 340 also includes an unauthorized recipient portion 342. Portion 342 specifically identifies the unauthorized recipient, Jacob Smith. That is, in the example shown, portion 342 states "Jacob Smith is not authorized to receive this mail." Portion 342 also illustratively includes another user input mechanism 344 that allows the user to quickly remove Jacob Smith from the recipient portion 302 of the email shown in FIG. 2C. Thus, display 340 provides a user input mechanism that, when actuated by the user 110, allows user 110 to take remedial action to bring the email into compliance with the policies described in description portion 320.

It should also be noted that in one embodiment, the offending recipient (Jacob Smith) is also indicated by a visual cue in portion 302. For instance, the name Jacob Smith in portion 302 can be shown in red, or in another color that visually distinguishes it on display 340 and that also distinguishes it from other, non-offending, recipients that may appear in portion 302.

Figure 2D:
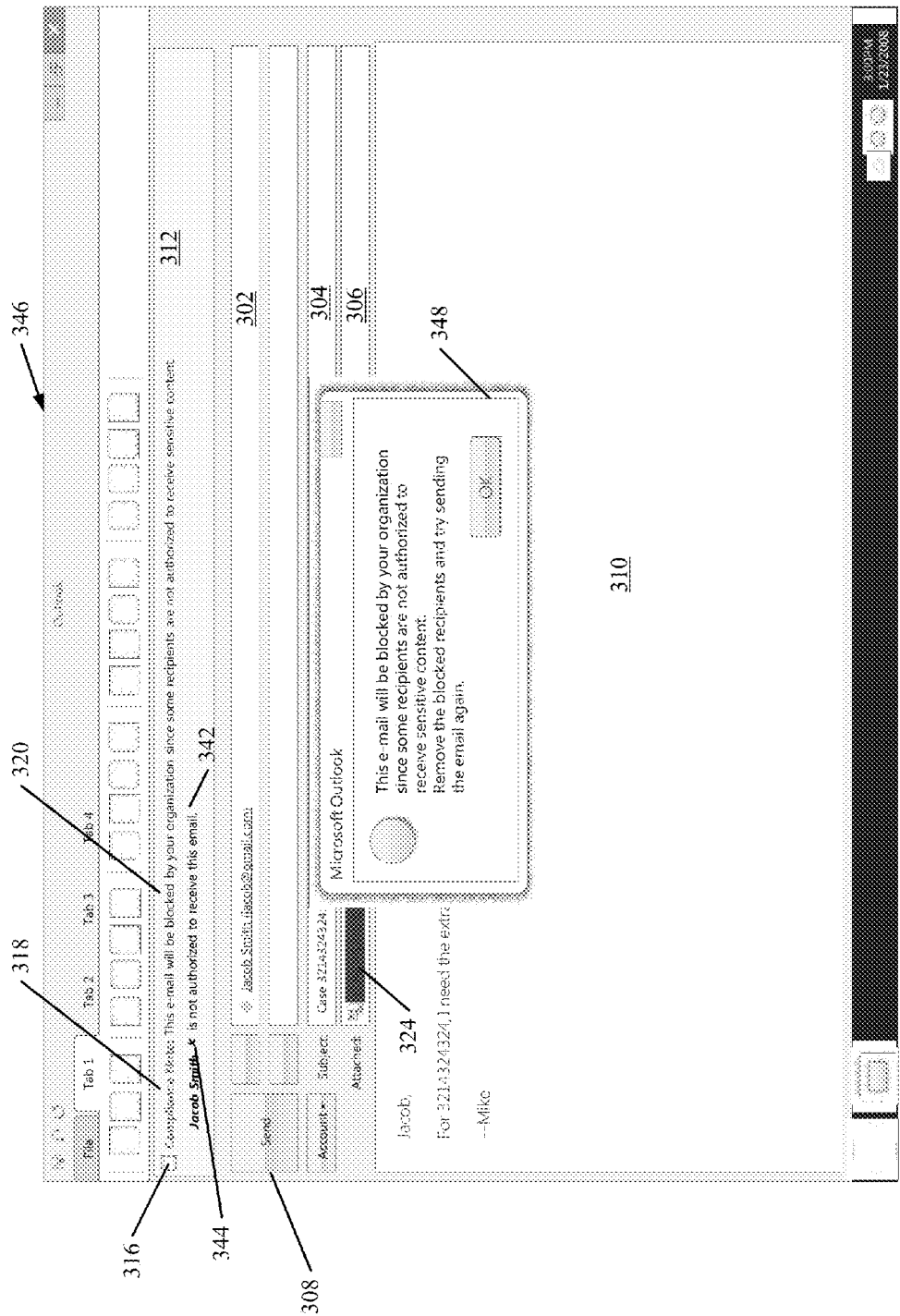

FIG. 2D shows another user interface display 346 that is similar to user interface display 340, and similar items are similarly numbered. However, it is assumed in FIG. 2D that the user has, without taking any remedial action, pressed the send button 308. In the embodiment shown in FIG. 2D, application 216 then generates a dialog box 348 that is displayed to user 110, and that explains that the blocking action was taken, and why. It also illustratively instructs the user has to how to comply with the data dissemination policy that resulted in the email being blocked. For instance, in the embodiment shown in FIG. 2D, dialog box 348 states "This email will be blocked by your organization since some recipients are not authorized to receive sensitive content. Remove the blocked recipient and try sending the email again." Thus, the dialog box 348 not only educates the user 110 as to the data dissemination policies being implemented, but also tells the user what action has been taken and how to come into compliance with the data dissemination policies. Display 346 also provides the element 344, which allows the user to quickly remedy the cause of the email being blocked.

Figure 2E:
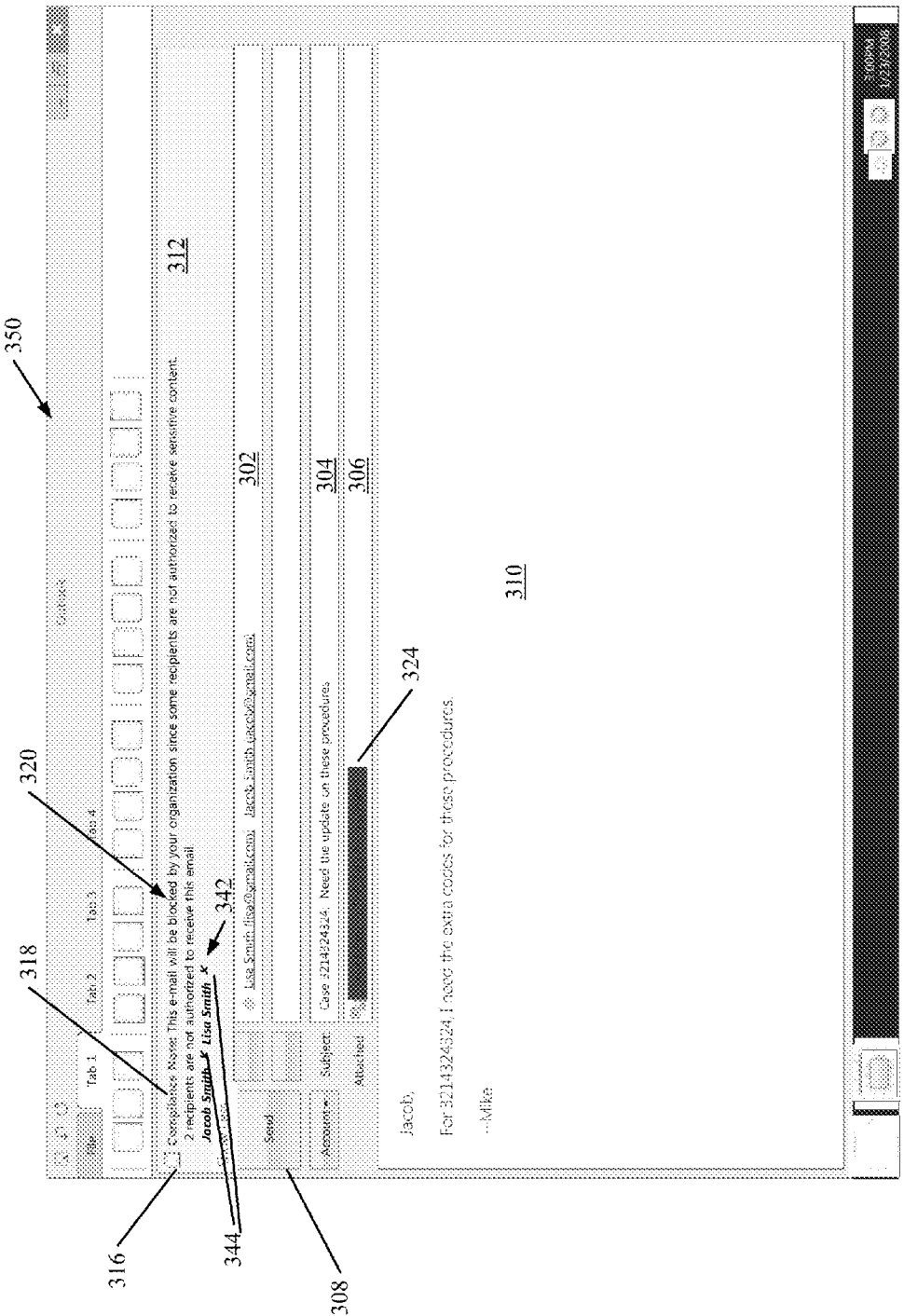

FIG. 2E shows another user interface display 350 that can be generated under different circumstances. Display 350 is similar to display 340 shown in FIG. 2C and similar items are similarly numbered. However, in the embodiment shown in FIG. 2E, there are two recipients that are unauthorized to receive the sensitive material in attachment 324. Therefore, display 350 shows that both recipients are listed in portion 342 and two user input mechanisms 344 are provided, one for each of the offending recipients. It should also be noted, in one embodiment, both offending recipients are not only listed in portion 342, but are visually distinguished from other, non-offending, recipients in recipient portion 302 of the email. For instance, in one embodiment, both of the offending recipients are shown in red in recipient portion 302 of the email.

Figure 2F:
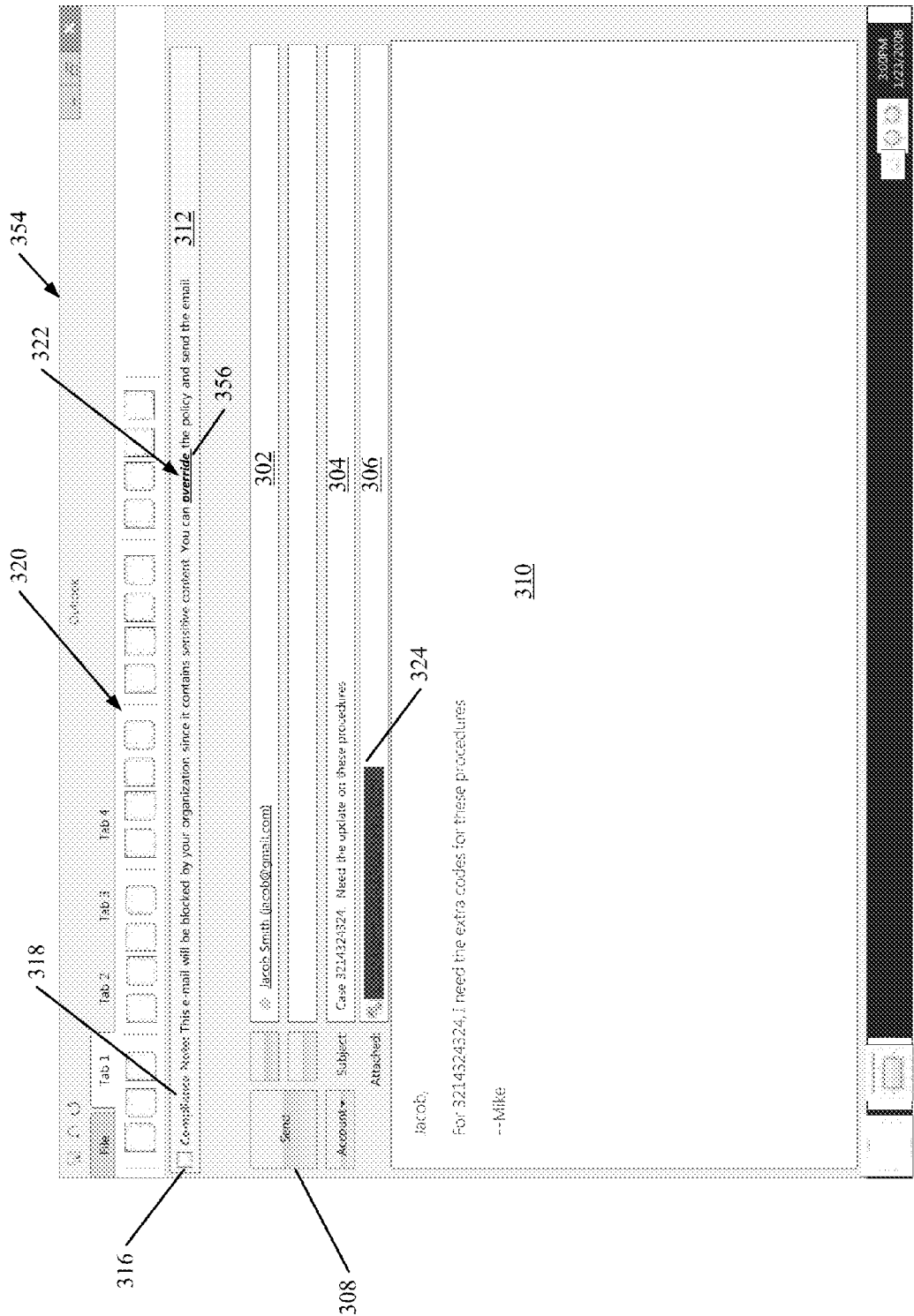

FIG. 2F shows yet another user interface display 354 that can be generated and that offers the user 110 an opportunity to override the action that will otherwise be taken. Some items in display 354 are similar to those shown in display 346 in FIG. 2D, and are similarly numbered. In the embodiment shown in FIG. 2F, sensitivity determination component 122 has, as described above, analyzed attachment 324 and determined that it contains sensitive content. Therefore, description portion 320 states "This email will be blocked by your organization since it contains sensitive content." Thus, portion 320 not only describes why the data dissemination policy is being implemented (because the document contains sensitive content) but also what will happen (the email will be blocked). However, FIG. 2F also shows that instruction portion 322 instructs the user 110 that the user can override the action and send the email anyway. In the embodiment shown in FIG. 2F, instruction portion 322 states "You can override the policy and send the email." In addition, the word override is visually distinguished and is offered as a user actuable button 356 which, when it is actuated by the user, causes application 116 to override the action set out in description portion 320. In the embodiment shown in FIG. 2F, when the user clicks the override button 356, application 116 sends the email to the listed recipients. This can be done for a number of different reasons. For instance, if user 110 has a good reason why the blocking operation should be overridden, then the user can simply override that action and send the email anyway. Of course, overriding the blocking action is only one example. The user can override other actions, when this option is offered on the user interface display.

Figure 2G:
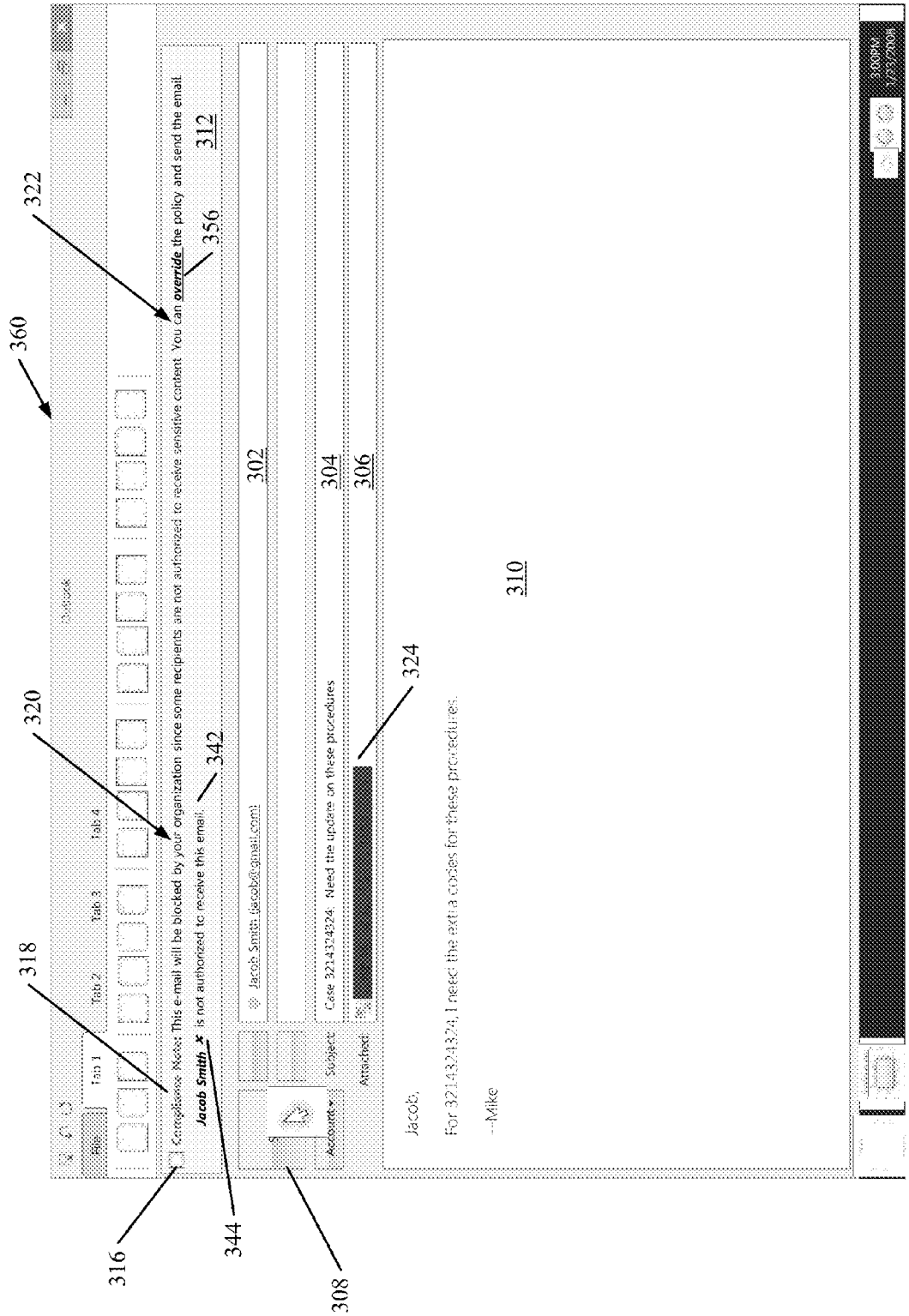
Figure 2H:
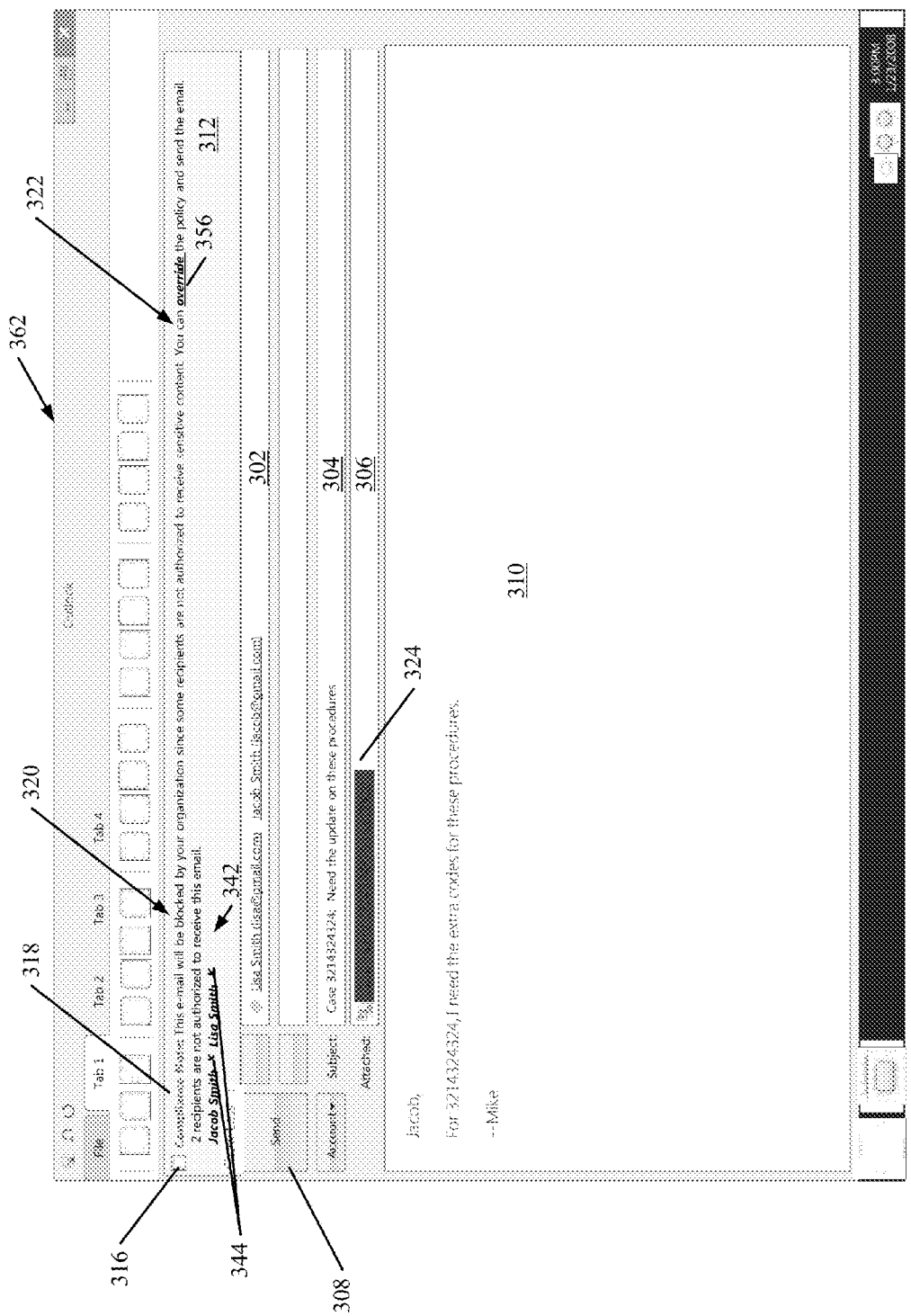

FIG. 2G shows one example of this. In the embodiment shown in FIG. 2F, the reason the email would be blocked is because it contained sensitive content. However, in the embodiment shown in FIG. 2G, description portion 320 states that the email will be blocked because it not only contains sensitive content, but because it is being sent to an unauthorized recipient. Portion 342 lists the unauthorized recipient. However, user interface display 360 also includes an instruction portion 322 that allows the user to override the policy and send the email anyway.

Display 360 also shows that application 116 has given user 110 two options in order to send the email. The first is to override it using button 356, but the second is to take a remedial action by removing the offending recipient by clicking element 344.

Display 362 shown in FIG. 3H is similar to display 360 shown in FIG. 2G, and similar items are similarly numbered. However, display 362 shows that there are now two offending recipients listed in portion 342. Therefore, in order to come into compliance with the data dissemination policy being implemented, the user must delete both users listed in portion 342. Of course, the user can also override the policy and send the email anyway, by actuating button 356.

Figure 2I:
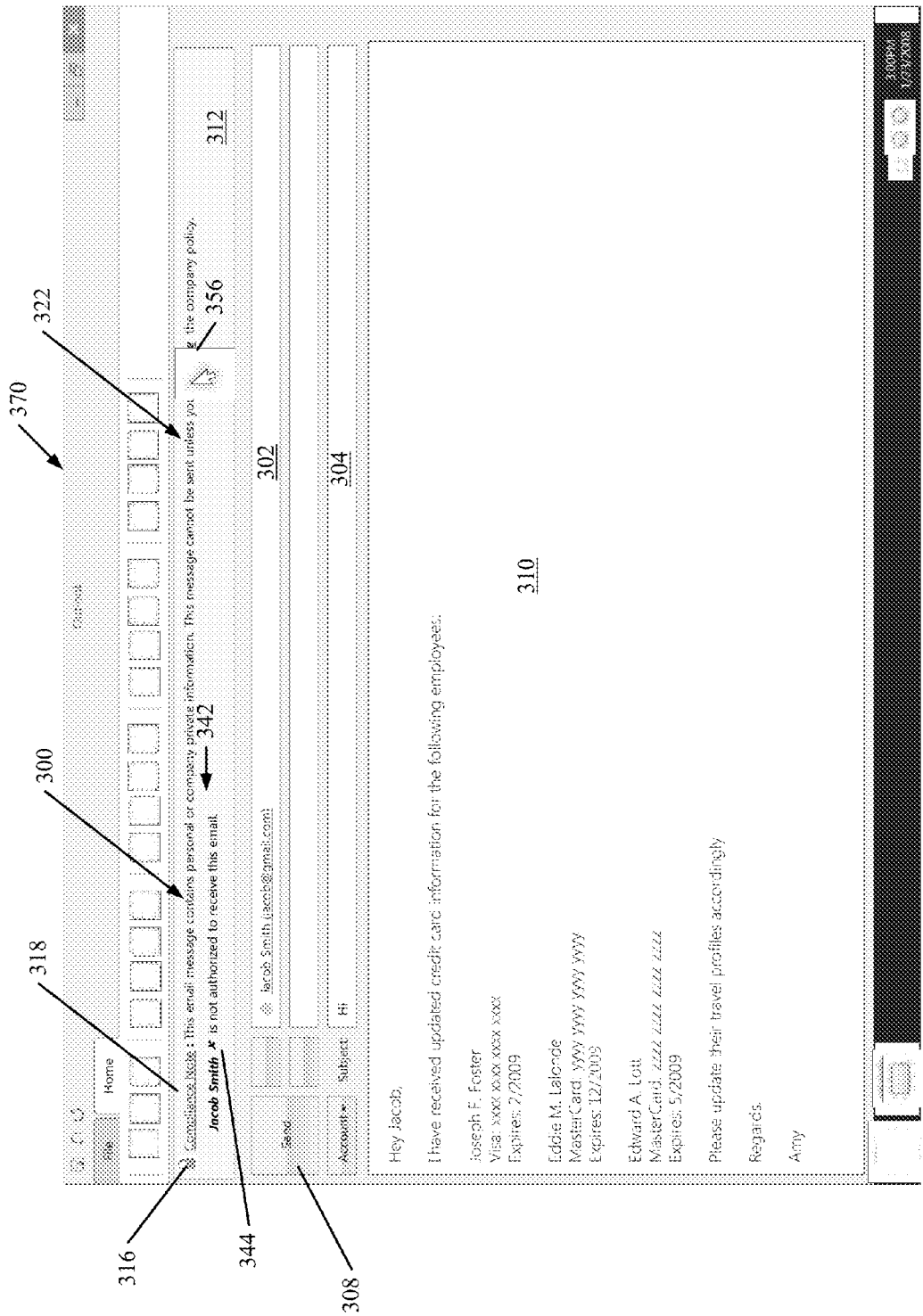
Figure 2J:
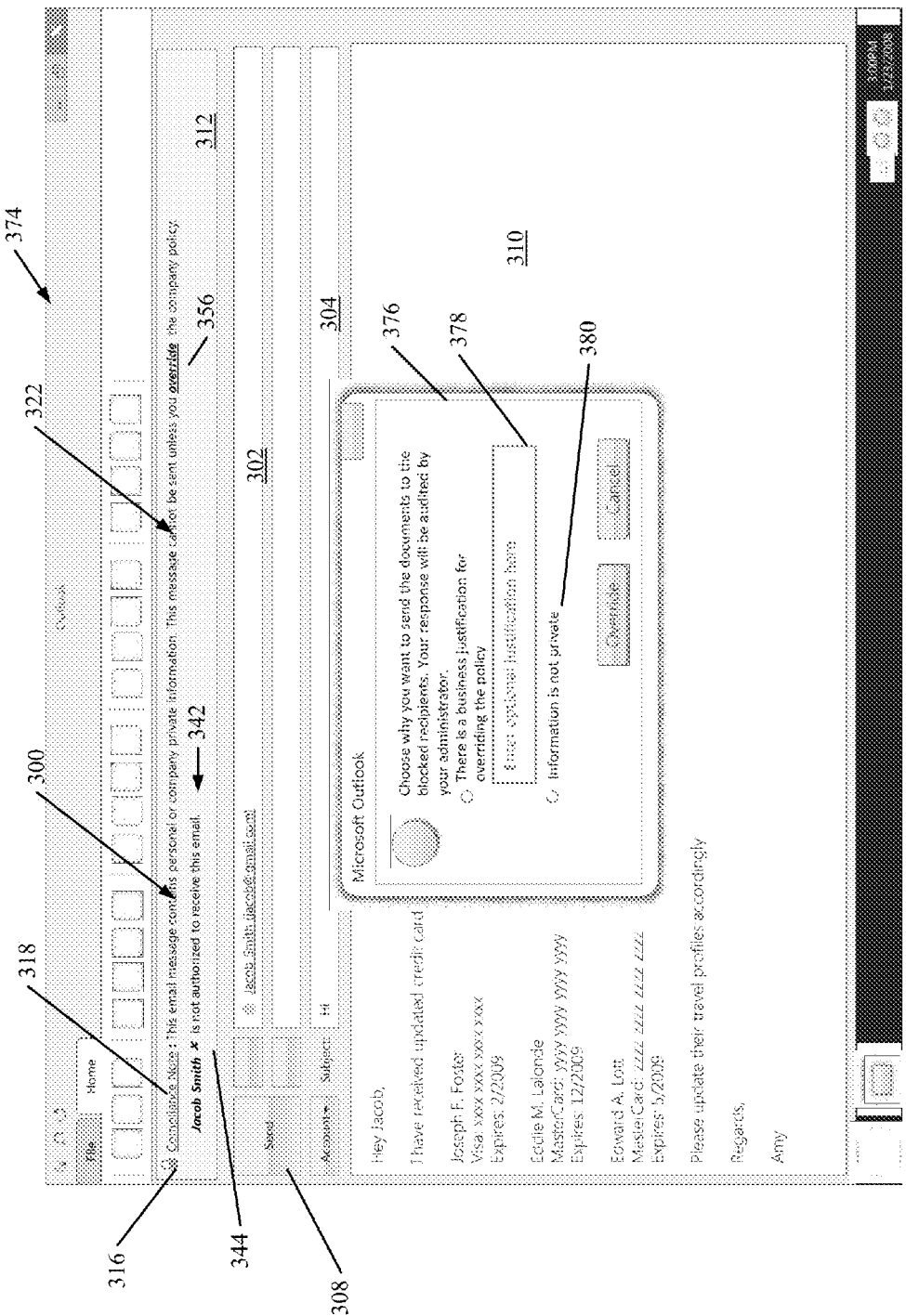

It should be noted that, when the user overrides a policy, some additional processing can be performed. For instance, certain members of the organization may be notified so that the override can be audited, or otherwise monitored by other personnel. FIGS. 2I and 2J illustrate one embodiment of this in more detail.

FIG. 2I shows a user interface display 370 that is similar to the user interface display 330 shown in FIG. 2B, and similar items are similarly numbered. However, in FIG. 2I, the description portion 320 states that the email contains personal or company private information and the instruction portion 322 states that message will not be sent unless the user overrides the company policy using button 356. In addition, portion 342 shows the offending recipients along with the user input element 344 that allows the user to quickly delete the offending recipient.

In the embodiment shown in FIG. 2I, the user has placed the cursor over button 356 and actuates the override button. That demonstrates the user intention to override company policies with respect to the sensitive information contained in the email. FIG. 2J shows another user interface display 374, that is similar to user interface display 370 shown in FIG. 2I. However, display 374 also shows that application 116 generates a dialog box 376. Dialog box 376 offers two additional user input mechanisms 378 and 380 which allow a user to choose a reason why the policy is to be overridden. User input mechanism 378 allows the user to input a textual justification as to why the user is overriding the policy. Input mechanism 380 allows the user to indicate that the information that sensitivity determination component 122 identified as being sensitive, is simply not sensitive.

In either case, in the embodiment shown in FIG. 2J, dialog box 276 indicates that the user justification will be audited by an administrator. In that case, application 116 illustratively sends the user's justification on to an administrator (such as over network 104 in FIG. 1) or to some other auditing personnel who can review the company policies and analyze why specific users are overriding those policies.

Figure 2K:
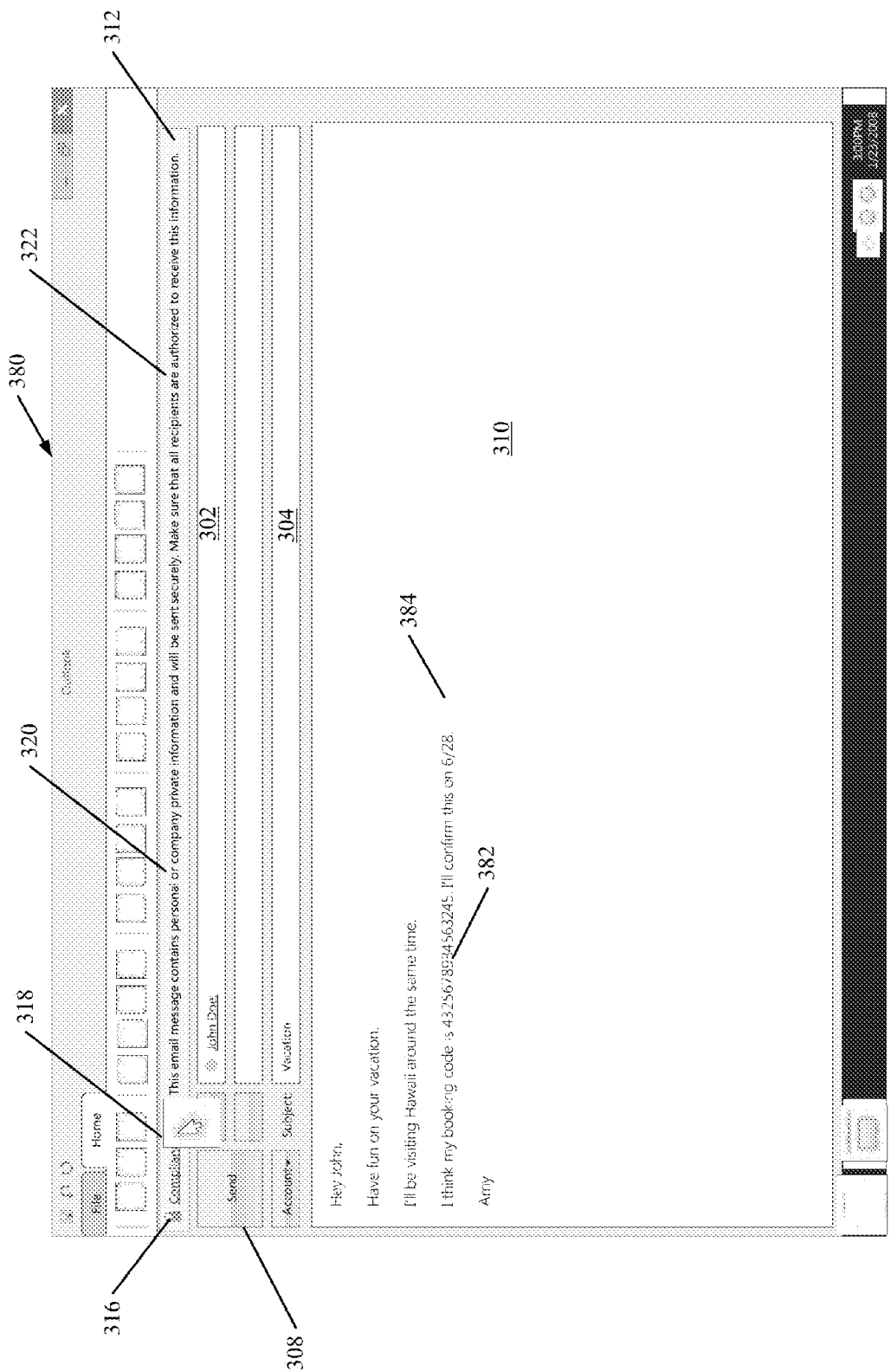
Figure 2L:
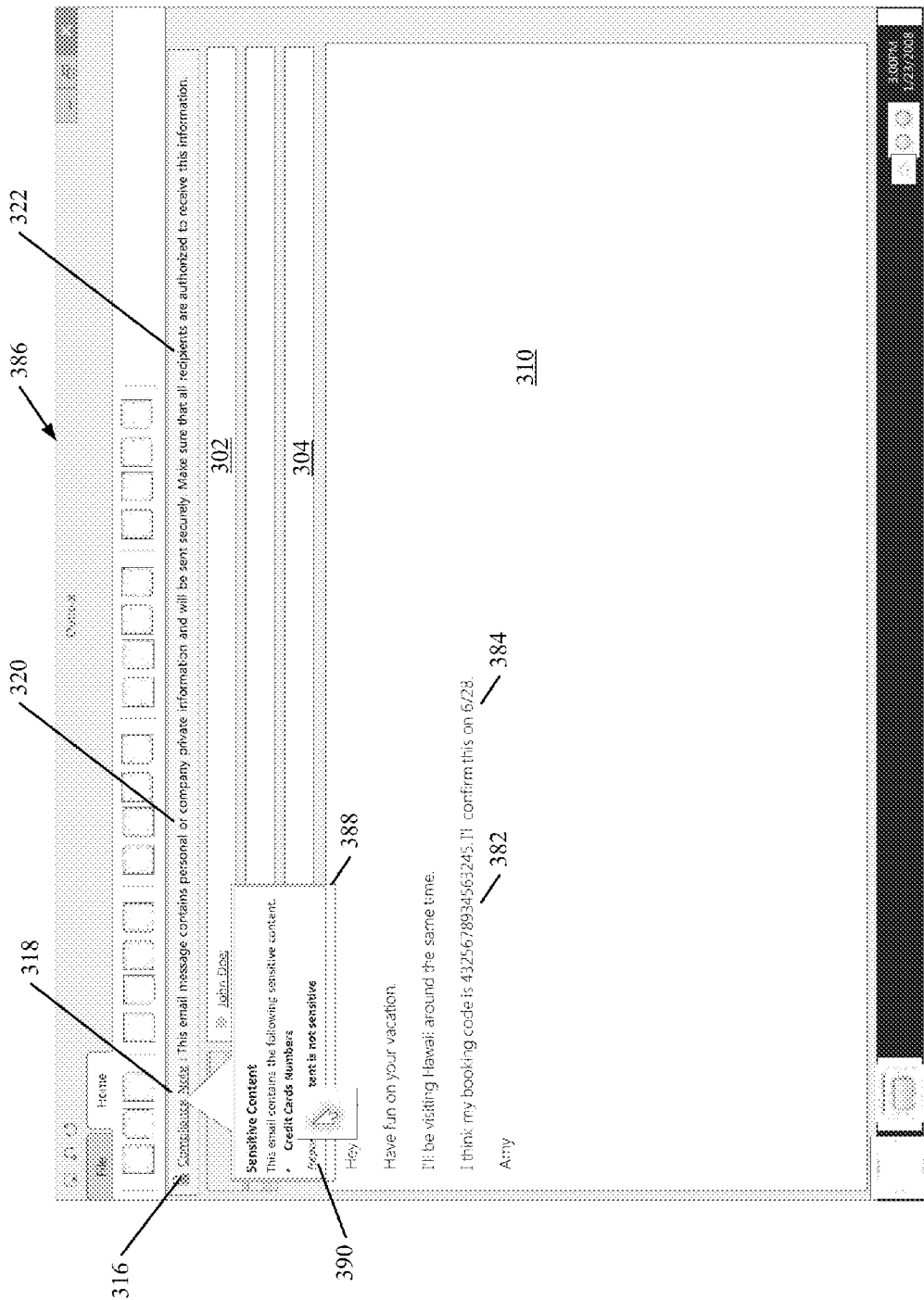
Figure 2M:
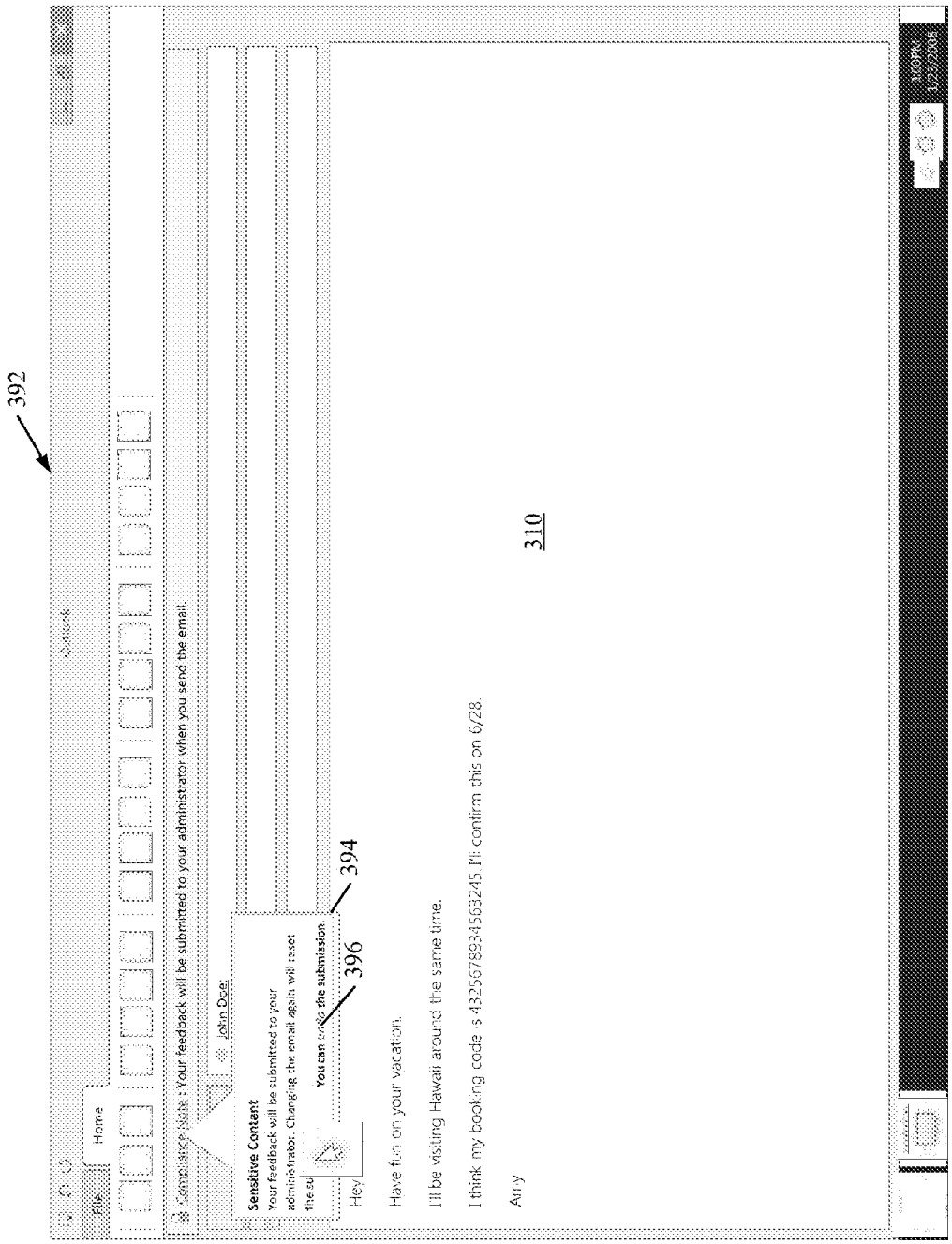

FIGS. 2K-2M show embodiments where sensitivity determination component 122 has identified information in document 112 (such as in the email shown in FIGS. 2K-2M) as being sensitive, but where that determination is incorrect.

FIG. 2K shows a user interface display 380 that is similar to some of the previous figures, and similar items are similarly numbered. However, FIG. 2K shows that the body portion 310 of the email contains a 16 digit number 382 and a date 384 closely proximate number 382. In the embodiment shown in FIG. 2K, sensitivity determination component 122 has analyzed the body 310 of the email and determined that number 382 is a credit card number and date 384 is the expiration date for the credit card. Thus, application 116 generates user interface display 380 where description portion 320 states that the email contains personal or company private information and must be sent securely, while instruction portion 322 instructs the user to make sure all recipients are authorized to receive the information. However, it can be seen from the context of the body 310 of the email that number 382 is actually a booking code and is not a credit card number, and date 384 is not an expiration date. Therefore, user 110 may wish to correct the determination made by component 122. Display 380 provides a user actuable input mechanism that allows the user to do so. In the embodiment shown in FIG. 2K, the compliance note header 318 is an actuable user input button. FIG. 2K shows that the user has placed the cursor over the compliance note header 318 and has actuated that button.

FIG. 2L shows a user interface display 386 that is generated when the user actuates the actuable button that comprises compliance note header 318. In the embodiment shown in FIG. 2L, dialog box 388 is generated which specifically indicates to the user what content of the body 310 of the email is believed to be the sensitive content. In the embodiment shown in FIG. 2L, dialog box 388 states that the email contains credit card numbers as the sensitive content.

Dialog box 388 also provides a user actuable button 390 that enables the user to provide feedback to application 116 as to the accuracy of the sensitivity determination made by component 122. By actuating button 390, the user 110 can provide feedback to application 116 indicating that sensitivity determination component 122 has misidentified the information in the email as being sensitive information. FIG. 2L shows that the user has placed the cursor over button 390 and has actuated it.

FIG. 2M shows user interface display 392 that is generated when the user has actuated button 390 in FIG. 2L. It can be seen in display 392 that dialog box 394 is generated. Dialog box 394 acknowledges the feedback received from user 110 as to the application of the data dissemination policies to the email shown in display 392. In addition, in one embodiment, dialog box 394 provides a user actuable button 396 that allows the user to undo the submission made by actuating button 390 in FIG. 2L.

FIGS. 2A-2M show various embodiments that can be generated where application 116 is an electronic mail application. However, as noted above, application 116 can be a different application, but the same features can be applied. For instance, assume that application 116 is a spreadsheet application and that user 110 has opened a new spreadsheet document and generated one column of customer names, a second column of customer addresses, a third column of credit card numbers and a fourth column of expiration dates corresponding to the credit card numbers in the third column. In such an embodiment, sensitivity determination component 122 analyzes the content of the spreadsheet document and identifies the credit card numbers as sensitive information. Then, application 116 generates a user interface display, such as at the top or bottom of the spreadsheet being viewed by the user 110, stating that the spreadsheet contains sensitive information.

Now assume that the user tries to save the spreadsheet to a public storage system. Application 116 illustratively applies the data dissemination policies to the sensitive information and blocks that operation, or notifies the user that he or she should not perform that operation, or blocks the operation and offers the user the ability to override data dissemination policy, or any of the other actions discussed above, or even different actions. All of these same features can be used with many other applications as well.

Figure 3:
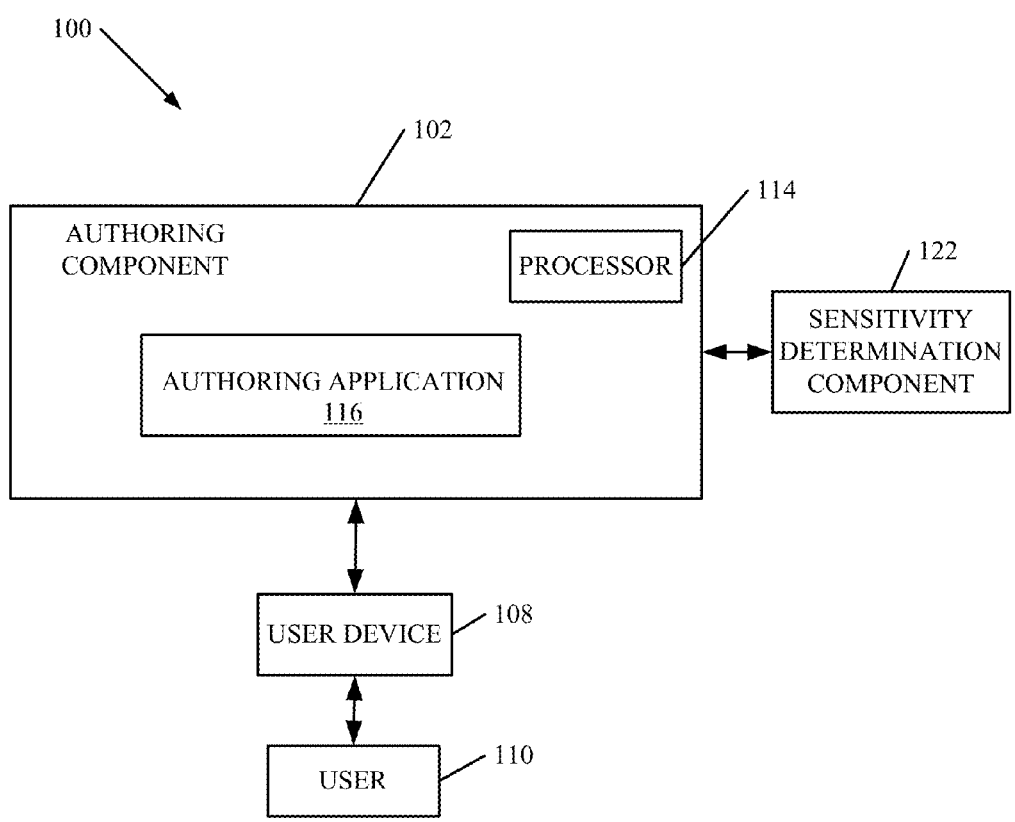
FIG. 3 shows another embodiment of the system shown in FIG. 1, with an external sensitivity determination component.

FIG. 3 shows another embodiment of system 100. Some of the items shown in FIG. 3 are similar to those shown in FIG. 1, and are similarly numbered. However, it can be seen from FIG. 3 that sensitivity determination component 122 is not part of authoring application 116, but is separate. In that case, authoring application 116 (or authoring component 102) makes calls to sensitivity determination component 122 when a document is being authored, in order to determine whether the document is sensitive. This is simply a different embodiment of the system shown in FIG. 100.

It should also be noted that system 100 can be deployed in a wide variety of different architectures. Different portions of system 100 can be deployed on user device 108, or on servers. In addition, portions of system 100 can be cloud-based services, deployed in a cloud-based architecture.

Also, they can be deployed in many architectures such as on a client device, hosted on a server, divided among one or more clients and one or more servers, or in a cloud computing architecture.

A cloud computing architecture illustratively include infrastructure, platforms and applications. The cloud services are coupled to other devices or systems such as cloud servers, desktop computers, tablet computers, laptop computers, cellular phones or smart phones or other mobile devices or personal digital assistants. Cloud computing provides computation, software, data access, and storage services, rather than products, that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of systems 100 as well as the corresponding data, can be stored on servers at a remote location in the cloud. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on a client device directly, or in other ways.

Figure 4:
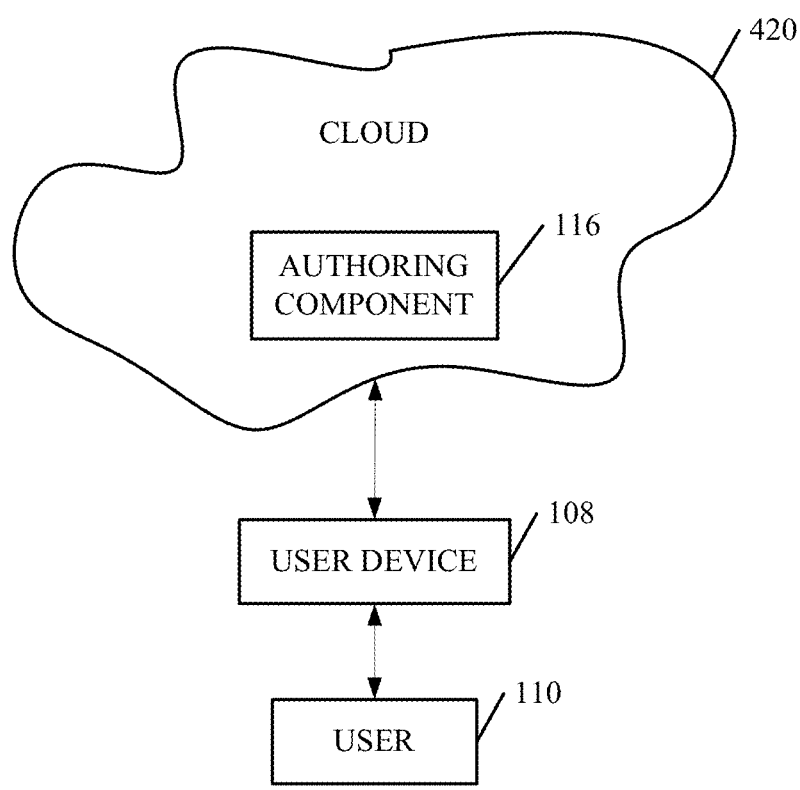
FIG. 4 shows one embodiment of the system shown in FIG. 1 in a cloud architecture.

FIG. 4 shows one embodiment of system 100 deployed in a cloud-based architecture. It can be seen from FIG. 4 that cloud 420 contains authoring application 116, while device 108 is not deployed in cloud 420.

Figure 5:
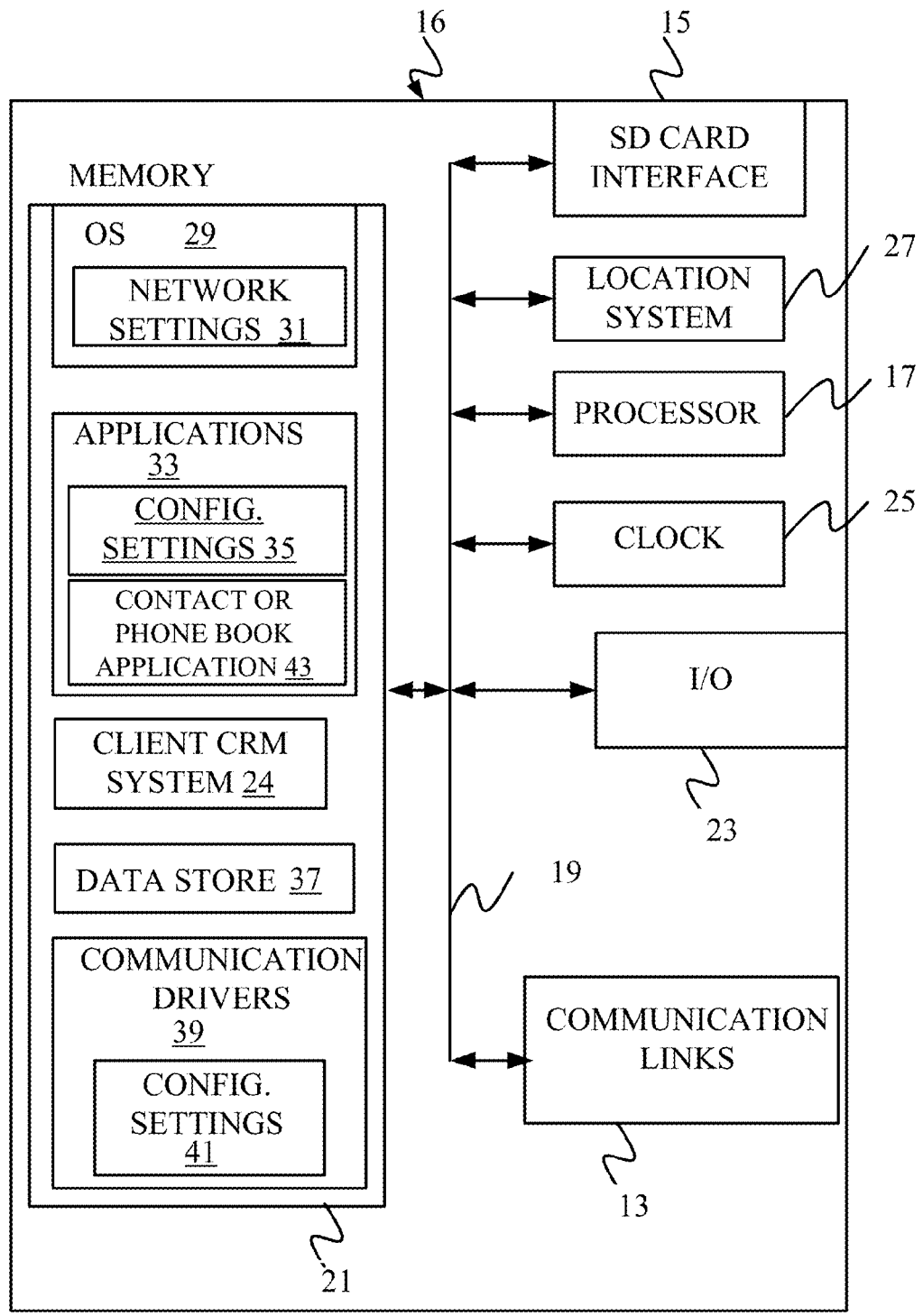
FIGS. 5-7 show various embodiments of mobile devices.
Figure 6:
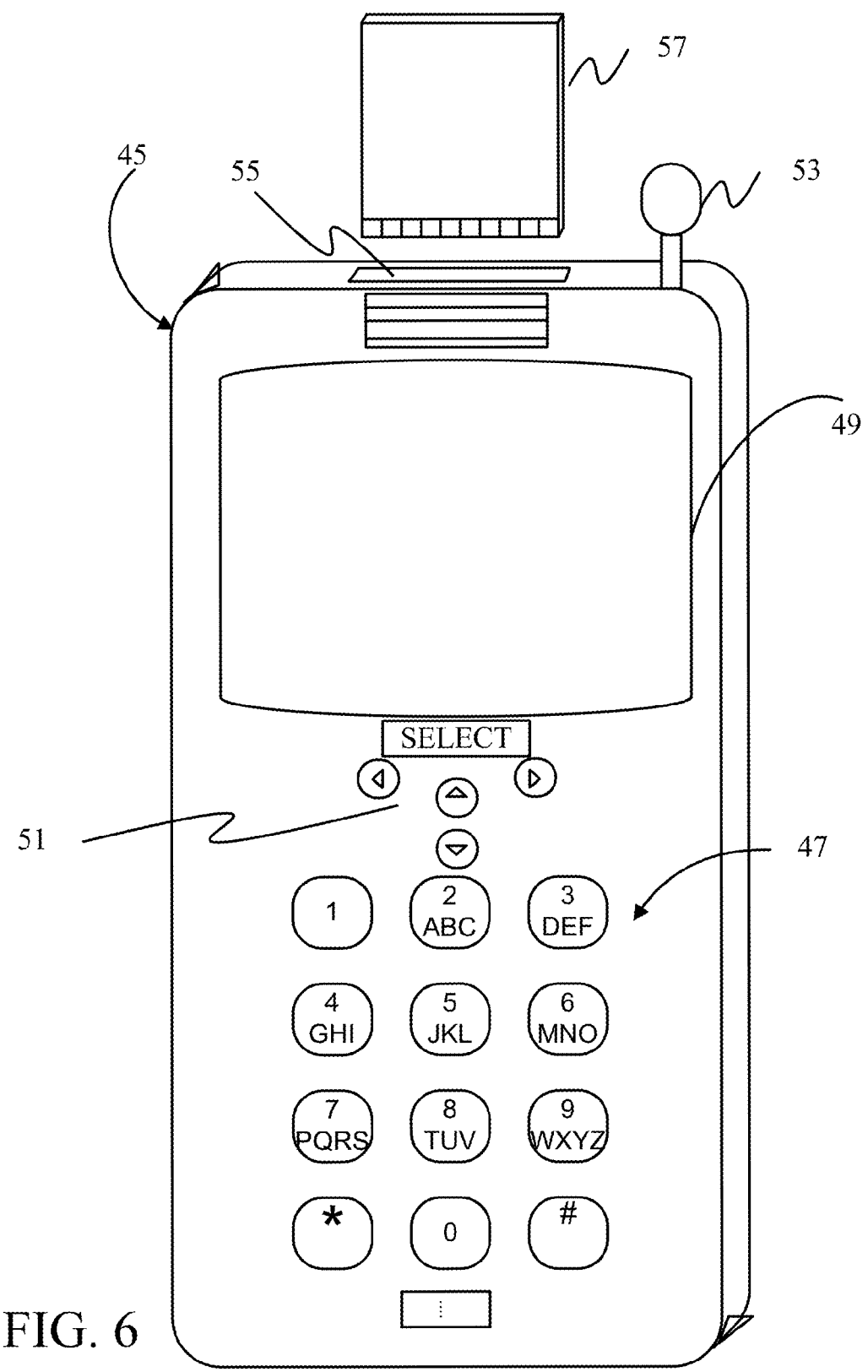
Figure 7:
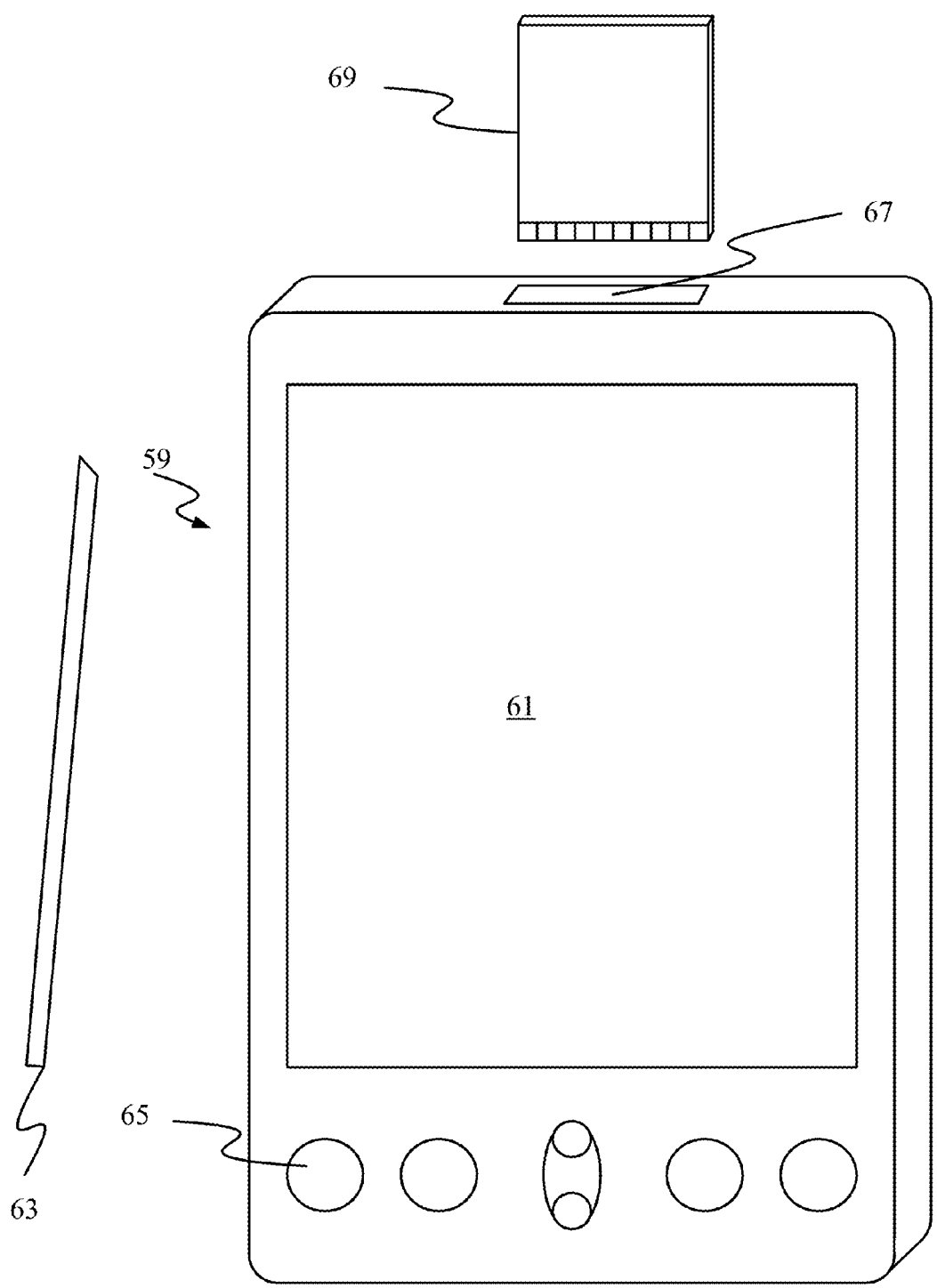

FIG. 5 is a simplified block diagram of one illustrative embodiment of a handheld or mobile computing device that can be used as user device (or client device) 108, in which the present system can be deployed. FIGS. 6 and 7 are examples of handheld or mobile devices.

FIG. 5 provides a general block diagram of the components of a client device 16 that can be user device 108 and can run components of system 100 or that interacts with system 100. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like system 100) are received on a removable Secure Digital (SD) card that is connected to a SD card interface 15. SD card interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Portions of system 100, for example, can reside in memory 21. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIGS. 6 and 7 provide examples of devices 16 that can be used, although others can be used as well. In FIG. 6, a smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 7 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Note that other forms of the devices 16 are possible. Examples include tablet computing devices, music or video players, and other handheld computing devices.

Figure 8:
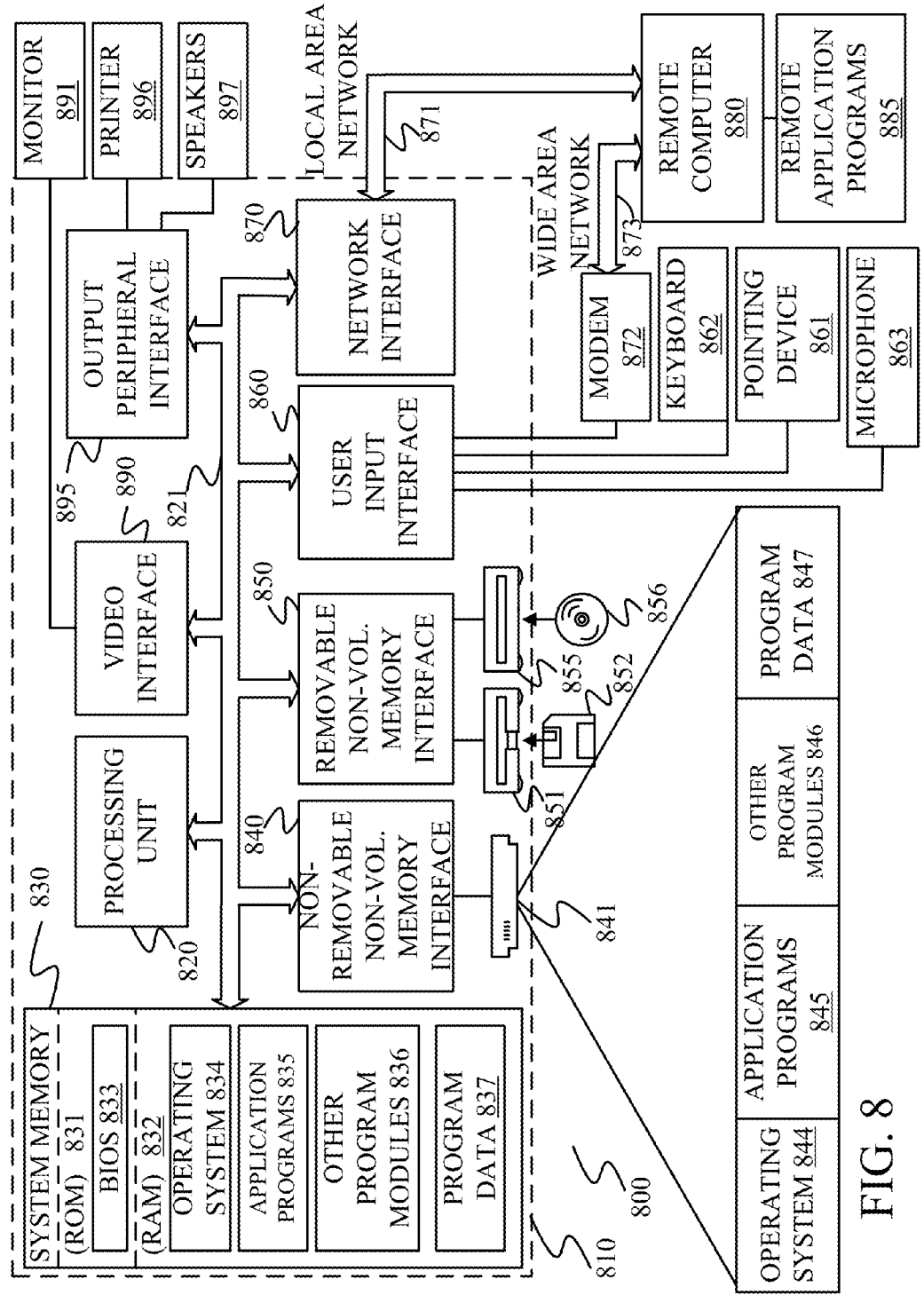
FIG. 8 shows one illustrative embodiment of a computing environment.

FIG. 8 is one embodiment of a computing environment in which system 100 (for example) can be deployed. With reference to FIG. 8, an exemplary system for implementing some embodiments includes a general-purpose computing device in the form of a computer 810. Components of computer 810 may include, but are not limited to, a processing unit 820 (which can comprise processor 114), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during startup, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of processing a document, the method comprising:
    generating a user interface that displays a document and includes one or more user input mechanisms for processing the document;
    receiving, through the user interface, a user input from a first user that includes an indication of one or more other users for which access to the document is desired by the first user;
    determining that the document is subject to a data dissemination policy; and
    automatically generating, in the user interface, one or more user interface elements that describe why the document is subject to the data dissemination policy and provide a visual cue, in the user interface, that specifically identifies a portion of the document that gives rise to the determination that the document is subject to the data dissemination policy.

2. The method of claim 1, wherein the determination that the document is subject to the data dissemination policy is based on the indication of the one or ore other users.

3. The method of claim 1, wherein the user interface displays document content of the document.

4. The method of claim 1, wherein the user interface displays a representation of the document.

5. The method of claim 1, wherein the data dissemination policy comprises a security policy.

6. The method of claim 1, further comprising:
generating a visual cue, in the user interface, that identifies how the document can be modified to comply with the data dissemination policy.

7. The method of claim 1, wherein determining the document is subject to a data dissemination policy includes analyzing content of the document to identify sensitive content in the document.

8. The method of claim 1, wherein the document comprises at least one of a word processing document or a spreadsheet document.

9. A computer-implemented method of processing a document, the method comprising:
generating a user interface that displays a document and includes one or more user input mechanisms for processing the document;
receiving, through the user interface, a user input that identifies a location where the document is to be stored;
determining that the document is subject to a security policy based on the location; and
generating, in the user interface, an indication that the document is subject to the security policy.

10. The method of claim 9, further comprising:
marking the location as sensitive; and
storing the document in the location.

11. The method of claim 9, wherein determining that the document is subject to a security policy comprises:
determining that the document is subject to the security policy independent of content of the document.

12. The method of claim 9, wherein the location comprises a collaboration site.

13. The method of claim 9, wherein the location comprises a folder.

14. The method of claim 9, wherein the indication includes a visual cue that identifies a portion of the document that gives rise to the determination that the document is subject to the security policy.

15. The method of claim 9, wherein the document comprises at least one of a word processing document or a spreadsheet document.

16. A document processing system, comprising:
a user interface component configured to generate one or more user interface displays for a document processing application; and
a security component configured to:
perform a sensitivity analysis on a document processed by the document processing application,
determine a security policy for the document based on the sensitivity analysis,
determine an action to be performed based on the determined security policy for the document,
generate an indicator, using a user interface component of the document processing application, that identifies how the document can be modified to comply with the determined security policy,
receive a user input, through a user interface component of the document processing application, that includes an indication to allow one or more users access to the document, and
perform the action in response to receiving the user input.

17. The system of claim 16, wherein the security component is configured to perform the action that includes a block operation of the one or more users from accessing the document.

18. The system of claim 16, wherein the security component is configured to perform the sensitivity analysis on the document by analyzing a storage location of the document and determining the document is sensitive based on the storage location.

19. The system of claim 16, wherein the security component is configured to perform the sensitivity analysis of the document by analyzing content of the document and determining the document is sensitive based on the content of the document, and wherein the generated indicator comprises a visual cue displayed in the one or more user interface displays that identifies how the document can be modified to comply with the determined security policy.

20. The system of claim 16, wherein the security component is configured to perform the action that includes generating a visual cue in the one or more user interface displays indicating sensitive subject matter from the document.

* * * * *